USO09772735B2

(12) United States Patent
Watazu

(10) Patent No.: US 9,772,735 B2
(45) Date of Patent: Sep. 26, 2017

(54) TOUCH SENSOR AND ELECTRONIC DEVICE

(71) Applicant: NISSHA PRINTING CO., LTD., Kyoto-shi, Kyoto (JP)

(72) Inventor: Yuji Watazu, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/436,052

(22) PCT Filed: Sep. 4, 2013

(86) PCT No.: PCT/JP2013/073829
§ 371 (c)(1),
(2) Date: Apr. 15, 2015

(87) PCT Pub. No.: WO2014/061363
PCT Pub. Date: Apr. 24, 2014

(65) Prior Publication Data
US 2015/0301660 A1 Oct. 22, 2015

(30) Foreign Application Priority Data
Oct. 16, 2012 (JP) .................................. 2012-228819

(51) Int. Cl.
G06F 3/045 (2006.01)
G06F 3/01 (2006.01)
(Continued)

(52) U.S. Cl.
CPC .............. *G06F 3/045* (2013.01); *G06F 3/017* (2013.01); *G06F 3/0412* (2013.01);
(Continued)

(58) Field of Classification Search
CPC ......... G06F 3/044; G06F 3/0412; G06F 3/045
See application file for complete search history.

(56) References Cited

U.S. PATENT DOCUMENTS

2009/0201268 A1 8/2009 Endo et al.
2010/0026664 A1* 2/2010 Geaghan ................. G06F 3/044
345/174

(Continued)

FOREIGN PATENT DOCUMENTS

CN 2553430 Y 5/2003
CN 102207787 A 10/2011
(Continued)

OTHER PUBLICATIONS

International Search Report in PCT/JP2013/073829 dated Nov. 12, 2013.

*Primary Examiner* — Carolyn R Edwards
*Assistant Examiner* — Scott Au
(74) *Attorney, Agent, or Firm* — Global IP Counselors, LLP

(57) ABSTRACT

A low cost touch sensor can, in conjunction with a detection of an input operation, perform detection related to a pressing force during the input operation. Upper part electrodes of the touch sensor are disposed such that they extend in an X axial direction and are arrayed in a Y axial direction that intersects the X axial direction. Furthermore, each upper part electrode comprises a plurality of upper part resistive films whose end parts in the X axial direction are electrically connected by a connection pattern. Lower part electrodes are disposed opposing the upper part resistive films and comprise lower part resistive films, whose contact surface area with the upper part resistive films varies in accordance with a pressing force that narrows the spacing to the upper part resistive films. A detection device detects contact between the upper part resistive films and the lower part resistive films based on the change in the resistance from the upper part electrodes to the lower part electrodes.

13 Claims, 15 Drawing Sheets

(51) Int. Cl.
*G06F 3/041* (2006.01)
*G09G 3/36* (2006.01)

(52) U.S. Cl.
CPC ............. *G06F 3/0414* (2013.01); *G09G 3/36* (2013.01); *G06F 2203/04101* (2013.01); *G06F 2203/04112* (2013.01)

(56) References Cited

U.S. PATENT DOCUMENTS

| | | | | |
|---|---|---|---|---|
| 2010/0156840 | A1* | 6/2010 | Frey | G06F 3/044 345/174 |
| 2010/0207907 | A1* | 8/2010 | Tanabe | G06F 3/045 345/174 |
| 2010/0265208 | A1* | 10/2010 | Kim | G06F 3/0412 345/174 |
| 2011/0109589 | A1* | 5/2011 | Furukawa | G06F 3/045 345/174 |
| 2011/0234508 | A1 | 9/2011 | Oda et al. | |
| 2011/0242047 | A1 | 10/2011 | Kim et al. | |
| 2012/0048465 | A1* | 3/2012 | Kim | G06F 3/045 156/290 |
| 2012/0050212 | A1* | 3/2012 | Yoo | G06F 3/045 345/174 |
| 2012/0182249 | A1 | 7/2012 | Endo et al. | |
| 2013/0222328 | A1* | 8/2013 | Cok | G06F 3/044 345/174 |
| 2013/0285970 | A1 | 10/2013 | Ahn et al. | |

FOREIGN PATENT DOCUMENTS

| | | |
|---|---|---|
| JP | H06-059795 A | 3/1994 |
| JP | 2001-216080 A | 8/2001 |
| JP | 2006-085286 A | 3/2006 |
| JP | 2011-076172 A | 4/2011 |
| JP | 2012-142016 A | 7/2012 |
| KR | 10-2011-0111709 A | 10/2011 |
| KR | 10-2012-0073140 A | 7/2012 |

* cited by examiner

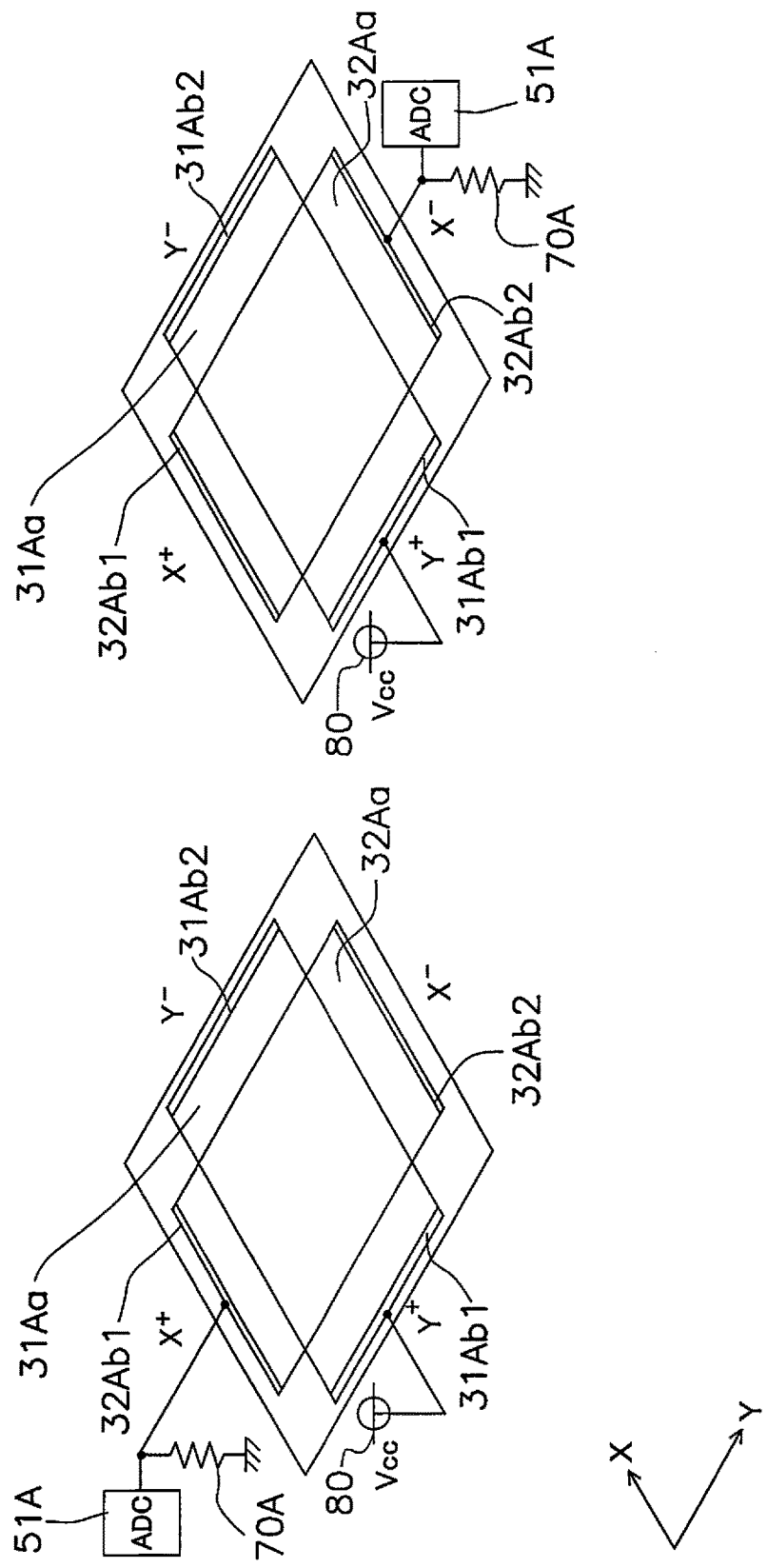

TOUCH SENSOR AND ELECTRONIC DEVICE

CROSS-REFERENCE TO RELATED APPLICATION

This U.S. National stage application claims priority under 35 U.S.C. §119(a) to Japanese Patent Application No. 2012-228819, filed in Japan on Oct. 16, 2012, the entire contents of Japanese Patent Application No. 2012-228819 are hereby incorporated herein by reference.

BACKGROUND

Field of the Invention

The present invention relates to a touch sensor that detects an input operation that is performed by making contact, such as in a push down operation, a sliding operation, or the like, and more particularly relates to a touch sensor that detects the input operation using resistive films, and to an electronic device that comprises the touch sensor.

Background Information

An electronic device that inputs and outputs information, such as a mobile telephone, a digital camera, a portable audio player, and the like, generally requires an input apparatus for operating the electronic device and inputting information. Such input apparatuses of electronic devices in recent years include, for example, as described in Japanese Unexamined Patent Application Publication No. 2011-76172, an input apparatus that is used by a touch input device that simultaneously detects the position of an input operation and the change in the pressing force generated by the input operation. In the touch input device described in Japanese Unexamined Patent Application Publication No. 2011-76172, the planar coordinates (XY coordinates) of the operation position of the input operation is detected by a touch panel, and the pressing force applied, in a direction (a Z direction) perpendicular to a panel surface of the touch panel, during the input operation is detected by a pressure sensitive sensor.

SUMMARY

However, in the touch input device described in Japanese Unexamined Patent Application Publication No. 2011-76172, in order to keep the cost of device production down, pressure sensitive ink is used in the pressure sensitive sensor that detects the pressing force, and there is a tendency that the variation of the sensitivity of the pressure sensitive sensor increases owing to variation in the quality of the pressure sensitive ink layer during its manufacture. If one attempts to achieve constant quality with high precision using pressure sensitive ink, it becomes difficult to lower the manufacturing cost. In addition, there is a problem with such touch input devices in that product cost increases owing to the use of a combination of two types of sensors, namely, a touch panel and a pressure sensitive sensor.

An object of the present invention is to provide, at low cost, a touch sensor that performs, in conjunction with the detection of an input operation, detection related to a pressing force during the input operation, and an electronic device that comprises the touch sensor.

As the technical solution, a plurality of aspects will be explained below. These aspects can be arbitrarily combined as needed.

A touch sensor according to one aspect of the present invention comprises: a first electrode that comprises a plurality of lines of first resistive films, the first resistive films being disposed to extend in a first direction and arrayed in a second direction that intersects the first direction, whose end parts in the first direction are electrically connected to each other; a second electrode that comprises at least one second resistive film disposed opposing the plurality of lines of first resistive films, the second electrode being arranged such that contact surface area between the at least one second resistive film and the plurality of lines of first resistive films varies in accordance with a pressing force that narrows a spacing between the plurality of lines of first resistive films and the at least one second resistive film; and a detection device that, based on a change in a resistance value from the first electrode to the second electrode, detects a contact between the plurality of lines of first resistive films and the at least one second resistive film and detects the extent of the contact surface area between the plurality of lines of first resistive films and the at least one second resistive film.

In the present touch sensor, at the time of contact between the plurality of lines of first resistive films and the at least one second resistive film, because the resistance value varies greatly at the plurality of lines of first resistive films, which extend in the first direction, the detection device can easily detect an input operation performed on the touch sensor. In addition to that, at the time of contact between the plurality of lines of first resistive films and the at least one second resistive film, because the resistance value varies greatly in accordance with the number of the first resistive films, which extend in the first direction, makes contact, the magnitude of the pressing force during an input operation can be detected based on the extent of the contact surface area between the first resistive films and the second resistive films, which can be easily detected by the detection device.

The present touch sensor may be one wherein the detection device detects the extent of the contact surface area based on a resistance value that varies in accordance with the number of lines of the first resistive films that makes contact with the at least one second resistive film. Because the resistance value, which varies in accordance with the number of contacting resistive films, varies comparatively greatly, the detection performed by the detection device becomes easy.

The present touch sensor may be one wherein the second electrode includes a plurality of lines of the second resistive films having end parts in the second direction electrically connected to each other and the plurality of lines of the second resistive films are disposed to extend in the second direction and arrayed in the first direction. At the time of contact between the plurality of lines of first resistive films and the plurality of lines of second resistive films, because the resistance value varies even more greatly at the plurality of lines of second resistive films, which extend in the second direction, the detection performed by the detection device becomes even easier.

The present touch sensor may be one wherein the detection device detects a coordinate in the first direction of a contact location between the first electrode and the second electrode based on a change in the resistance value detected by impressing a first voltage that generates an electric potential difference in the first direction, and detects a coordinate in the second direction of the contact location based on a change in the resistance value detected by impressing a second voltage that generates an electric potential difference in the second direction. Because the detection device detects the position of the contact location at coordinates within a plane that includes the first direction and the second direction, the application of the touch sensor can be widened.

The present touch sensor may be one wherein the plurality of lines of first resistive films are arranged into a plurality of sets arrayed in the second direction; the at least one line of second resistive film are arranged into a plurality of sets arrayed in the first direction; and the detection device detects the coordinates in the first direction and the second direction of a contact location based on a matrix of the plurality of sets of the plurality of lines of first resistive films and the plurality of sets of the at least one second resistive film. Because the detection device detects the position of the contact location at coordinates within a plane that includes the first direction and the second direction, the application of the touch sensor can be widened.

The present touch sensor may be one wherein the second electrode includes a plurality of lines of the second resistive films having end parts in the first direction electrically connected to each other and the plurality of lines of the second resistive films are disposed to extend in the first direction and arrayed in the second direction. The plurality of lines of first resistive films and the plurality of lines of second resistive films are disposed such that each line of the first resistive films corresponds to one line of the second resistive films. At the time of contact between the plurality of lines of first resistive films and the plurality of lines of second resistive films, because the resistance value varies even more greatly at the plurality of lines of second resistive films, which extend in the first direction, the detection performed by the detection device becomes even easier.

The present touch sensor may be one that further comprises: a first connecting member for electrically connecting together the end parts in the first direction of the plurality of lines of the first resistive films; and a plurality of resistance adding members that are connected between the plurality of lines of first resistive films and the first connecting member, each resistance adding member adding resistance to the corresponding line of first resistive film. Because the resistance value varies even more greatly at the time of contact by the resistance adding members with the plurality of lines of first resistive films, the detection performed by the detection device becomes even easier.

The present touch sensor may be one that further comprises: a pressure sensitive ink layer that is provided between the plurality of lines of first resistive films and the at least one second resistive film and whose resistance value varies in accordance with the pressing force between the plurality of lines of first resistive films and the at least one second resistive film. Because the change in the resistance value of the pressure sensitive ink layer in accordance with the pressing force is further added to the resistance value between the plurality of lines of first resistive films and the at least one second resistive film, the detection of the pressing force performed by the detection device becomes even easier.

An electronic device according to a second aspect of the present invention comprises a touch sensor that includes: a first electrode that comprises a plurality of lines of first resistive films, the plurality of lines of first resistive films being disposed to extend in a first direction and arrayed in a second direction that intersects the first direction, whose end parts in the first direction are electrically connected to each other; a second electrode that comprises at least one second resistive film disposed opposing the plurality of lines of first resistive films, the second electrode being arranged such that contact surface area between the at least one line of second resistive film and the plurality of lines of first resistive films varies in accordance with a pressing force that narrows a spacing between the plurality of lines of first resistive films and the at least one second resistive film; and a detection device that, based on a change in a resistance value from the first electrode to the second electrode, detects a contact between the plurality of lines of first resistive films and the at least one second resistive film and detects the extent of the contact surface area between the plurality of lines of first resistive films and the at least one second resistive film; and also comprises a control apparatus connected to the touch sensor and that receives input data related to contact between the plurality of lines of first resistive films and the at least one second resistive film detected by the detection device and related to the extent of a contact surface area between the plurality of lines of first resistive films and the at least one second resistive film.

The present invention can provide, at low cost, a touch sensor that, in conjunction with the detection of the input operation, can perform detection related to the pressing force during an input operation; and, in turn, an electronic device that comprises such a touch sensor.

BRIEF DESCRIPTION OF THE DRAWINGS

FIG. 14A is a schematic drawing that shows the circuit connection that detects the pressing force at locations near the Y+ side and the X+ side, and FIG. 14B is a schematic drawing that shows the circuit connection that detects the pressing force at locations near the Y+ side and the X− side;

DETAILED DESCRIPTION OF EMBODIMENTS

<First Embodiment>
(1) Overview of Configuration of Touch Sensor

Figure 1:
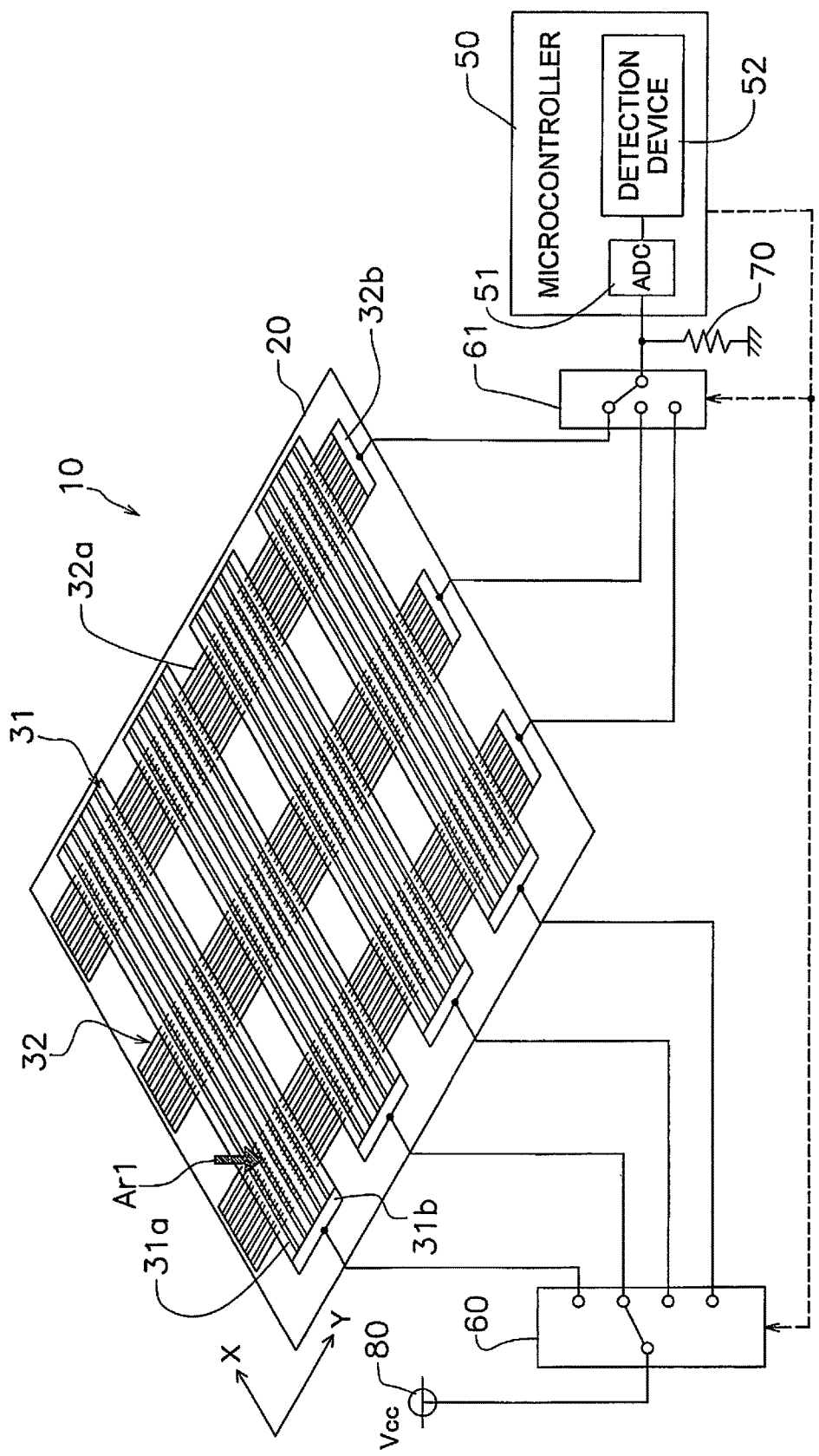
FIG. 1 is a schematic drawing that shows an overview of a touch sensor according to a first embodiment.

FIG. 1 is a schematic drawing that shows an overview of a touch sensor according to a first embodiment of the present invention. A touch sensor 10 comprises a sensor panel 20, a microcontroller 50, switch circuits 60, 61, and a reference resistor 70. The touch sensor 10 shown in FIG. 1 is configured such that the position and the pressing force of contact made by a finger or the like in order to perform an input operation can be detected by a matrix resistive film type.

The sensor panel 20 is connected to the reference resistor 70 via the switch circuit 61. The reference resistor 70 has a constant resistance value. In addition, the sensor panel 20 is connected to a DC supply 80 for applying a DC voltage Vcc, via the switch circuit 60. In the reference resistor 70, one terminal is connected to an output terminal of the switch circuit 61, and the other terminal is connected to ground. The microcontroller 50 is connected to the one terminal of the reference resistor 70 and receives a voltage generated at the one terminal of the reference resistor 70.

An input terminal of the switch circuit 60 is connected to the DC supply 80, and four output terminals of the switch circuit 60 are connected to upper part resistive films 31a, four sets of which are arrayed in the Y axial direction. In response to a command from the microcontroller 50, the switch circuit 60 switches the connection between the input terminal and the output terminals, and thereby the DC voltage Vcc is sequentially impressed upon each of the four sets of the upper part resistive films 31a.

Input terminals of the switch circuit 61 are connected to lower part resistive films 32a, three sets of which are arrayed in the X axial direction. In response to a command from the microcontroller 50, the switch circuit 61 switches the connection between the input terminals and the output terminal, and thereby the three sets of the lower part resistive films 32a and the one terminal of the reference resistor 70 are sequentially connected.

The microcontroller 50 comprises an A/D converter 51 and a detection device 52. The A/D converter 51 outputs a digital signal in accordance with the value of the voltage that arises at the one terminal of the reference resistor 70. The detection device 52 detects, based on the digital signal output from the A/D converter 51, the value of the voltage that arises at the reference resistor 70, and detects both the coordinates at which the upper part resistive films 31a and the lower part resistive films 32a make contact owing to the input operation and the pressing force of the input operation.

(2) Operation of Detection Device

In FIG. 1, a set of four upper part electrodes 31 are denoted, in order from the one pointed at by an arrow Ar1, a first row, a second row, a third row, and a fourth row; a set of three lower part electrodes 32 are denoted, in order from the one pointed at by the arrow Ar1, a first column, a second column, and a third column; and the explanation below is made accordingly. In addition, in the explanation below, the coordinates of an overlapping portion between an $M^{th}$ row upper part electrode 31 and an $N^{th}$ column lower part electrode 32 are represented as (M, N). In the touch sensor 10 of FIG. 1, M, N are natural numbers that satisfy the conditions $1 \leq M \leq 4$ and $1 \leq N \leq 3$, respectively.

First, the switch circuit 60 connects the DC supply 80 to the first row upper part electrode 31. In this state, the switch circuit 61 sequentially switches the connection from between the first column lower part electrode 32 and the reference resistor 70 to between the third column lower part electrode 32 and the reference resistor 70. When the first row upper part electrode 31 and the first column lower part electrode 32 make contact, the microcontroller 50 detects a drop in the resistance value between the first row upper part electrode 31 and the first column lower part electrode 32 and detects that there was an input operation at coordinates (1, 1), namely, the overlapping portion between the first row upper part electrode 31 and the first column lower part electrode 32.

Furthermore, while the switch circuit 60 sequentially switches the connection from between the second row upper part electrode 31 and the DC supply 80 to between the fourth row upper part electrode 31 and the DC supply 80, the switch circuit 61 repeatedly performs, with each row as described above, the switching from the first column lower part electrode 32 to the third column lower part electrode 32. However, because a drop in the resistance value is not detected outside of the overlapping portion between the first row upper part electrode 31 and the first column lower part electrode 32, the microcontroller 50 detects that an input operation did not occur outside of the coordinates (1, 1).

Figure 2A:
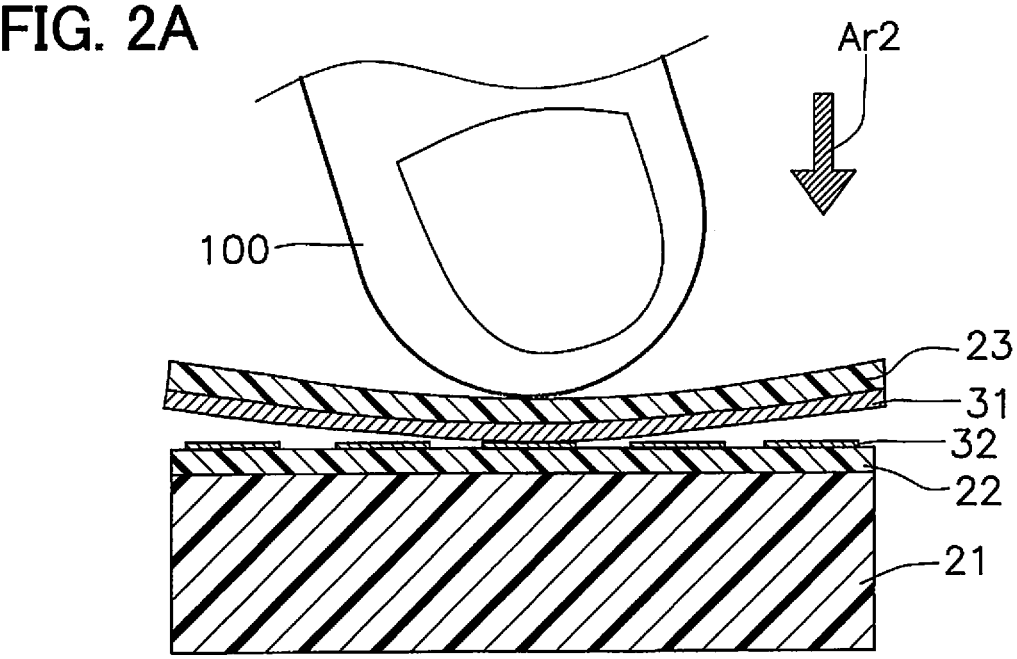
FIG. 2A is a schematic partial cross sectional view of a sensor panel that is being pressed with a small pressing force.
Figure 2B:
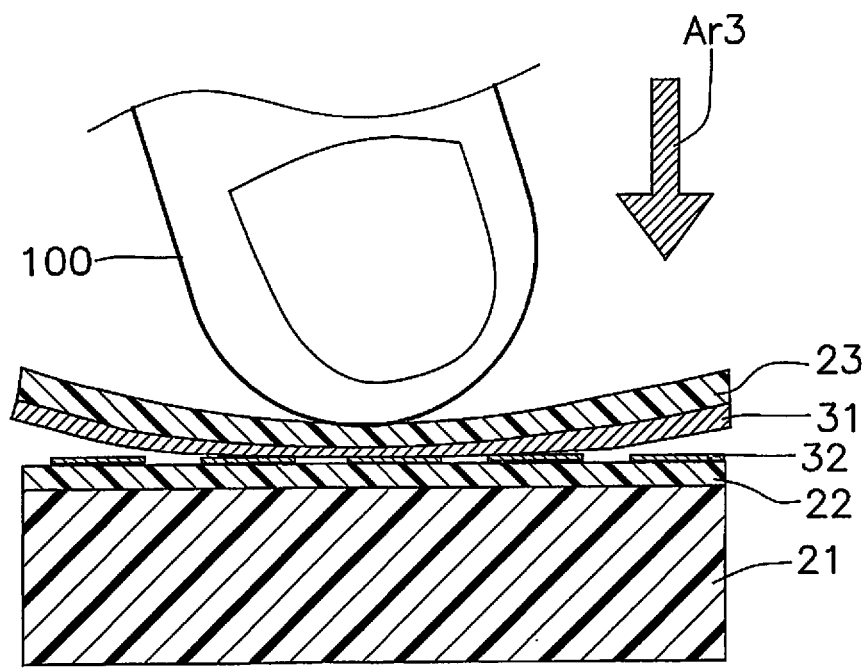
FIG. 2B is a schematic partial cross sectional view of the sensor panel that is being pressed with a large pressing force.

In addition, if the microcontroller 50 detects that there was an input operation at the coordinates (1, 1), then it also detects the pressing force during the input operation. FIG. 2 is a view for explaining the relationship between the pressing force and the deformation of the sensor panel 20, wherein FIG. 2A shows the cross sectional shape of the sensor panel 20 for the case wherein the pressing force is small, and FIG. 2B shows the cross sectional shape of the sensor panel 20 for the case wherein the pressing force is large. In FIG. 2, the sizes of arrows Ar2, Ar3 represent the magnitudes of the pressing forces produced by a finger 100 of an operator. Before explaining the detection of the pressing force in the microcontroller 50, the structure of the sensor panel 20 will be explained in detail, referencing FIG. 3.

(3) Structure of Sensor Panel

Figure 3:
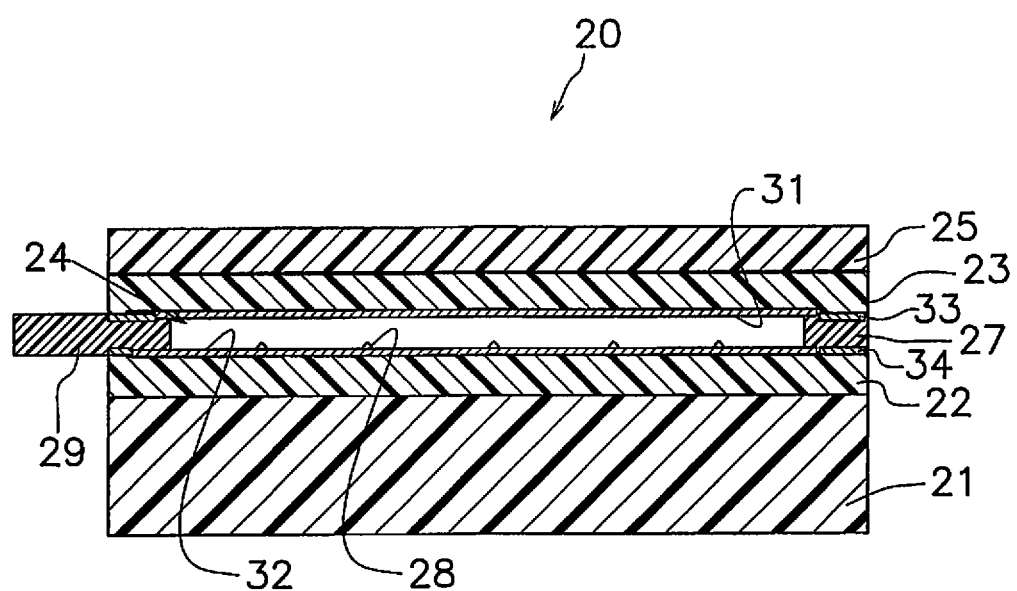
FIG. 3 is a schematic partial cross sectional view that shows an overview of the layer structure of the sensor panel.

FIG. 3 shows an overview of the cross sectional structure of the sensor panel 20. The sensor panel 20 in FIG. 3 has a plurality of layers, which principally comprises: a resin plate 21; a PET (polyethylene terephthalate) film 22, which is layered on the resin plate 21; a PET film 23, which is disposed opposing the PET film 22; an air layer 24, which is formed between the two PET films 22, 23; and a hard coat film 25, which is disposed on the PET film 23.

To form the air layer 24, the two PET films 22, 23 are attached to each other in a way that they oppose one another and are spaced apart by a fixed length by a spacer 27 that surrounds the perimeter of the air layer 24.

On a lower surface of the PET film 23, which is an opposing surface that opposes the PET film 22, the upper part electrode 31 is formed. The upper part electrode 31 is formed of indium tin oxide (ITO) so that light can be transmitted therethrough. On an upper surface of the PET film 22, which is an opposing surface that opposes the PET film 23, the lower part electrode 32 is formed. The lower part electrode 32 is formed of ITO so that light can be transmitted therethrough. At the perimeter of the lower part electrode 32, dot spacers 28 are formed. The dot spacers 28 are formed of insulating bodies made of acrylic urethane resin or the like and are spaced apart from each other by a constant spacing. The dot spacers 28 are formed by printing or the like and prevent the upper part electrodes 31 and the lower part electrodes 32 from making contact at portions where an input operation is not being performed.

The hard coat film 25 has greater hardness and scratch resistance than the PET films 22, 23, has good recoverability characteristics with respect to damage, and is made of, for example, PET resin, polyimide, or the like.

Figure 4A:
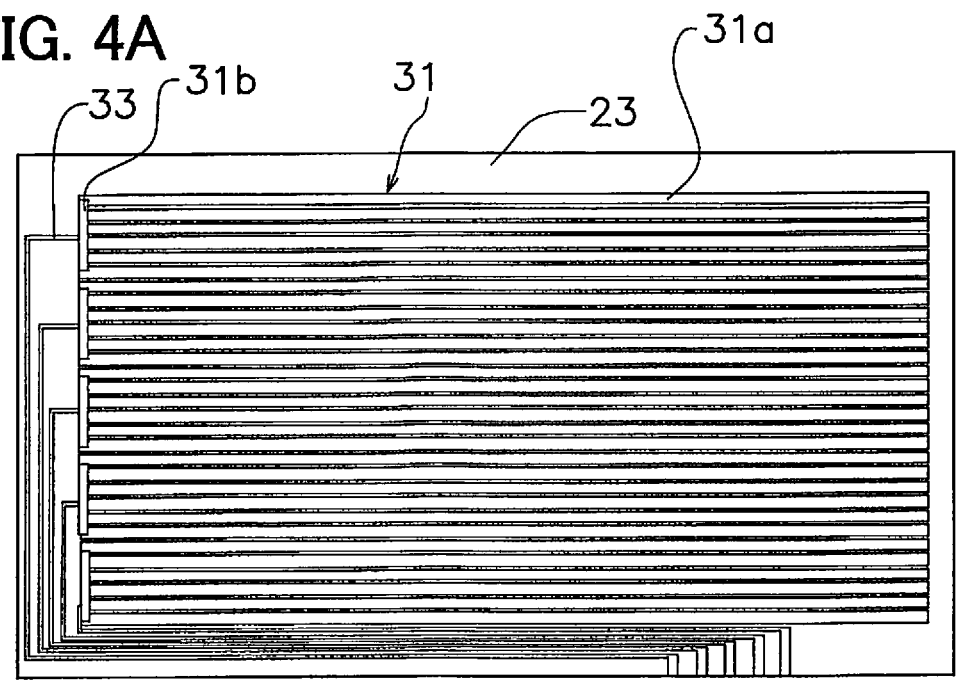
FIG. 4A is a plan view that shows upper part electrodes of FIG. 1 and wiring patterns at the peripheries thereof.
Figure 4B:
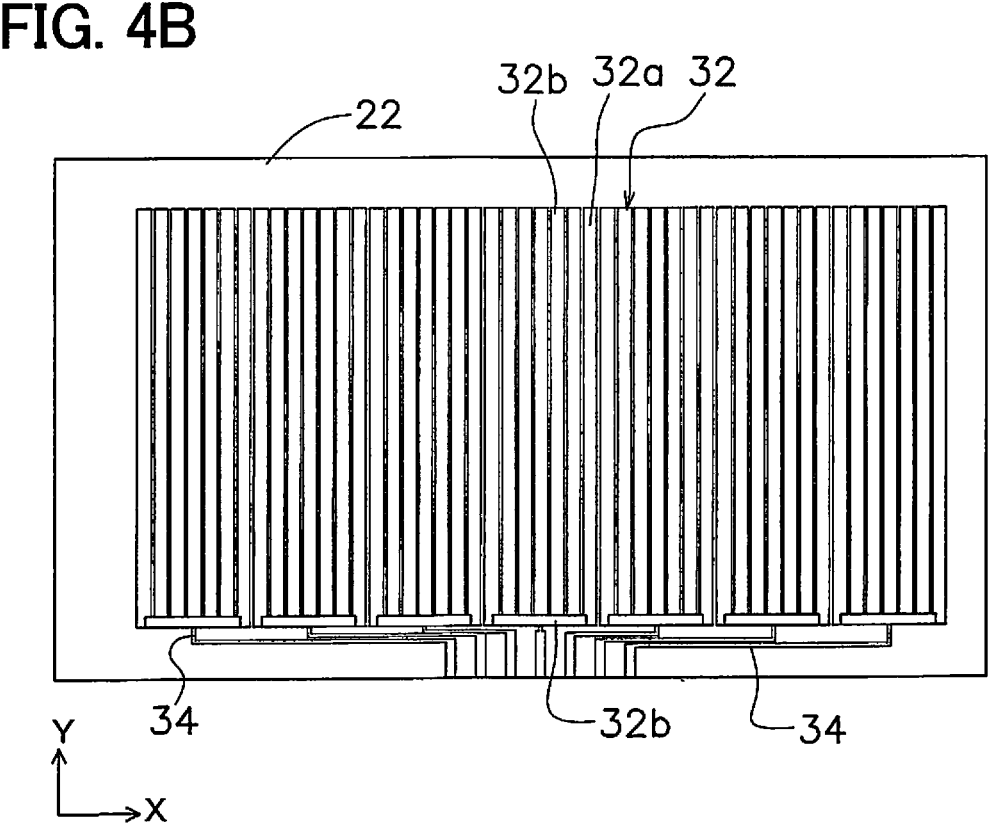
FIG. 4B is a plan view that shows lower part electrodes of FIG. 1 and wiring patterns at the peripheries thereof.

At the perimeter of the lower part electrode 32 on the upper surface of the PET film 22 and at the perimeter of the upper part electrode 31 on the lower surface of the PET film 23, metal wiring patterns 33, 34 are formed of a silver paste, copper foil, or the like. A flexible printed circuits 29 (hereinbelow, called FPC), which is for making a connection to the switch circuits 60, 61, is connected to the metal wiring patterns 33, 34. FIG. 4A shows one example of a pattern on the lower surface of the PET film 23, and FIG. 4B shows one example of a pattern on the upper surface of the PET film 22. In the example shown in FIG. 4A, five sets of the upper part resistive films 31a are provided, each set having six lines of upper part resistive films 31a extending in the X axial direction and arrayed in the Y axial direction. In each set, the six lines of upper part resistive films 31a are connected together by a connection pattern 31b at one end in the X axial direction. In the example shown in FIG. 4B, seven sets of the lower part resistive films 32a are provided, each set having seven lower part resistive films 32a extending in the Y axial direction and arrayed in the X axial direction. In each set, the seven lines of lower part resistive films 32a are connected together by a connection pattern 32b at one end in the Y axial direction.

(4) Detection of Pressing Force by the Sensor Panel

In the sensor panel 20, when the pressing force is small, for example, in the case shown in FIG. 2A, only one line of the lower part resistive films 32a makes contact with the upper part resistive films 31a. Although not shown in FIG. 2A, likewise, the number of the upper part electrodes 31 that makes contact with the lower part electrode 32 is also one line. In contrast, when the pressing force is large, for example, in the case shown in FIG. 2B, the number of the lower part resistive films 32a that makes contact with the upper part resistive films 31a is three lines. Although not shown in FIG. 2B, likewise, the number of the upper part electrodes 31 that makes contact with the lower part electrodes 32 is also three lines. Furthermore, the number of lines of the upper part electrodes 31 and the lower part electrodes 32 that makes contact as shown herein is merely one example; depending on the way that the pressing is done, differences may arise in the number of lines of the upper part electrodes 31 and the lower part electrodes 32 that makes contact.

Figure 5:
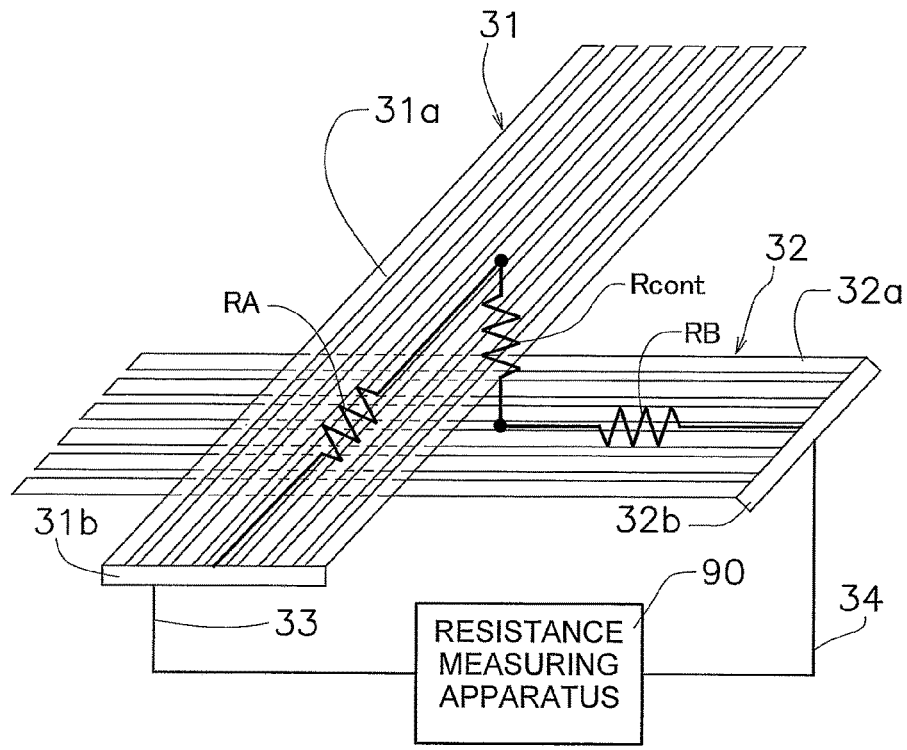
FIG. 5 is a conceptual diagram for explaining the relationship between the pressing force and the resistance between one of the upper part electrodes and one of the lower part electrodes.

FIG. 5 is a view wherein, for example, the first row upper part electrode 31 and the first column lower part electrode 32 shown in FIG. 1 are extracted. A resistance measuring apparatus 90 in FIG. 5 is an apparatus that measures a resistance value from the upper part electrode 31 to the lower part electrode 32 and is an apparatus that comprises, for example, the microcontroller 50, the switch circuits 60, 61, and the reference resistor 70 shown in FIG. 1. The resistances of the metal wiring patterns 33, 34 shown in FIG. 5 are sufficiently small compared with the upper part resistive films 31a and the lower part resistive films 32a. Consequently, even if the resistances of the metal wiring patterns 33, 34 are ignored during the detection of the pressing force, the pressing force may be detected. However, to improve accuracy, the pressing force may be detected while taking into consideration the resistances of the metal wiring patterns 33, 34.

A comparison between the state shown in FIG. 2A, wherein the pressing force is comparatively small, and the state shown in FIG. 2B, wherein the pressing force is comparatively large, will now be explained. First, in the state shown in FIG. 2A, a contact resistance Rcont arises at a contact location where one line of upper part resistive film 31a and one line of lower part resistive film 32a make contact. The resistance value of one line of upper part resistive film 31a, from this contact location to the connection pattern 31b, is a resistance value RA of the upper part electrode 31 in the state shown in FIG. 2A. In addition, the resistance value of one line of lower part resistive film 32a, from the contact location to the connection pattern 32b, is a resistance value RB of the lower part electrode 32 in the state shown in FIG. 2A. Next, in the state shown in FIG. 2B, the contact resistance Rcont arises at the contact location where three lines of upper part resistive films 31a and three lines of lower part resistive films 32a make contact. The resistance value of the parallel connection of the three lines of upper part resistive films 31a, from the contact location to the connection pattern 31b, is the resistance value RA of the upper part electrode 31 in the state shown in FIG. 2B. In addition, the resistance value of the parallel connection of the three lines of lower part resistive films 32a, from the contact location to the connection pattern 32b, is the resistance value RB of the lower part electrode 32 in the state shown in FIG. 2B.

In contrast with the state shown in FIG. 2A, where there is one contact point, there are nine contact points in the state shown in FIG. 2B. Therefore it is understood that the contact resistance Rcont in the state shown in FIG. 2B is smaller. In addition, because every line of upper part resistive film 31a is formed in the same manner, it is obvious that the resistance value RA in the state shown in FIG. 2B is approximately one third of the resistance value RA of the upper part electrode 31 in the state shown in FIG. 2A. Likewise, because every line of lower part resistive film 32a is formed in the same manner, it is also obvious that the resistance value RB in the state shown in FIG. 2B is approximately one third of the resistance value RB of the lower part electrode 32 in the state shown in FIG. 2A. The resistance value measured by the resistance measuring apparatus 90 is derived based on the sum of the contact resistance Rcont, the resistance value RA, and the resistance value RB. In such a configuration of the sensor panel 20, the contact resistance Rcont is sufficiently small compared with the resistance value RA and the resistance value RB, and consequently the magnitudes of the pressing forces in the state shown in FIG. 2A and the state shown in FIG. 2B can be detected based on the sums of the resistance value RA and the resistance value RB. In this case, because the sum of the resistance value RA and the resistance value RB in the state shown in FIG. 2B is approximately one third of the sum of the resistance value RA and the resistance value RB in the state shown in FIG. 2A, it can be easily detected that the pressing force in the state shown in FIG. 2B is larger.

Figure 6:
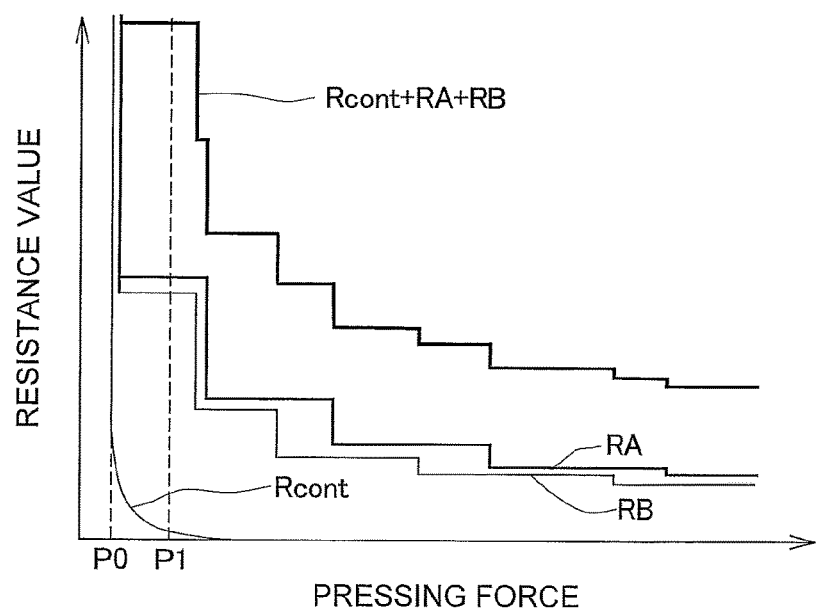
FIG. 6 is a graph that shows the relationship between the pressing force and the resistance value for the upper part electrode and the lower part electrode in FIG. 5.

The graph in FIG. 6 generalizes the above explanation and shows the relationship between the pressing force and the resistance value. In FIG. 6, up until a pressing force P0 occurs, the upper part electrode 31 and the lower part electrode 32 do not make contact, and therefore the contact resistance Rcont, the resistance value RA of the upper part electrode 31, the resistance value RB of the lower part electrode 32, and the resistance value Rcont+RA+RB measured by the resistance measuring apparatus 90 are extremely large values that exceed the measurable level. At a pressing force P1, a state results wherein, for example, two lines of upper part resistive films 31a and two lines of lower part resistive films 32a make contact. In the graph shown in FIG. 6, the change in the resistance value at each step of the graph, which changes in a stepped manner, is large, but the graph can also be made to approach a smooth curve by increasing the number of lines of upper part resistive films 31a in one set and the number of lines of lower part resistive films 32a in one set.

Figure 7:
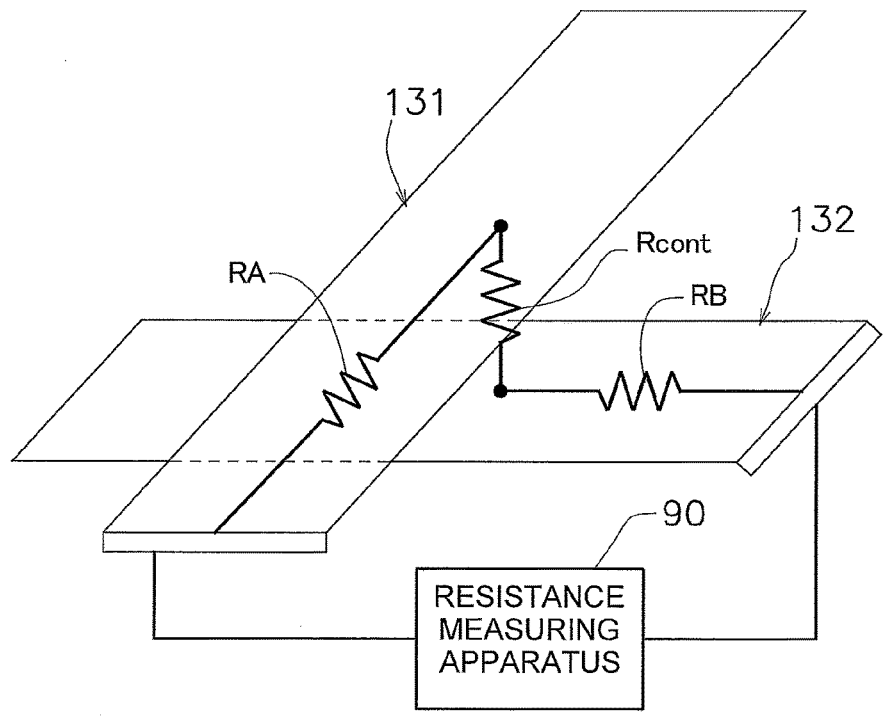
FIG. 7 is a conceptual diagram for explaining the relationship between the pressing force and the resistance between an upper part electrode that comprises one upper part resistive film and a lower part electrode that comprises one lower part resistive film.
Figure 8:
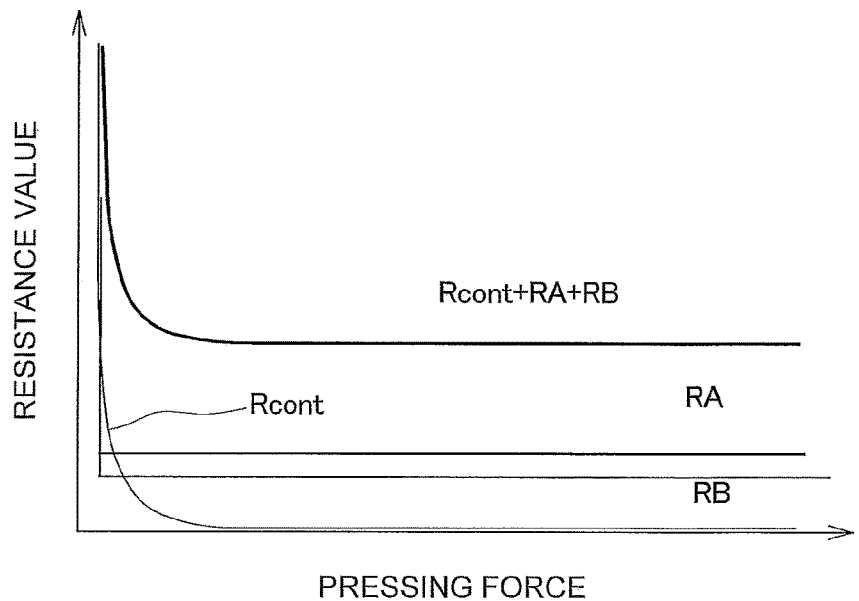
FIG. 8 is a graph that shows the relationship between the pressing force and the resistance value for the upper part electrode and the lower part electrode in FIG. 7.

Here, to assist in understanding the principle of the detection of the pressing force, changes in the resistance values that arise in a conventional upper part electrode 131 and a conventional lower part electrode 132 are shown in FIG. 7 and FIG. 8. As shown in FIG. 7, in the upper part electrode 131 and the lower part electrode 132, the number of lines of the resistive films does not vary with the contact surface area. Accordingly, both the resistance value RA of the upper part electrode 131 and the resistance value RB of the lower part electrode 132 do not vary with the pressing force after contact is made. In addition, even though the contact resistance Rcont of the upper part electrode 131 and the contact resistance Rcont of the lower part electrode 132 vary, the resistance values do not vary sufficiently so that they can be stably measured. Thus, because the upper part electrode 131 and the lower part electrode 132 do not have shapes like those of the upper part resistive films 31a and the lower part resistive films 32a, stable measurement of the pressing force is difficult when using a sensor panel that comprises the upper part electrode 131 and the lower part electrode 132 as in the conventional art.

(5) Detection of Pressing Force by the Detection Device

The relationship between the pressing force and the resistance value at the same coordinates was explained referencing FIG. 5. If the pressing forces are the same but the coordinates are different, then the contact resistance value Rcont is the same; nonetheless, the value of the resistance value RA of the upper part electrode 31 and the value of the resistance value RB of the lower part electrode 32 will differ in accordance with the coordinates. For example, the number of lines of the upper part resistive films 31a of the upper part electrode 31 that makes contact is substantially the same if the pressing force is the same. However, if the length of the upper part resistive films 31a from the contact location to the connection patterns 31b varies in accordance with the coordinates, then the resistance value RA will also differ as the X coordinates differ.

Figure 9:
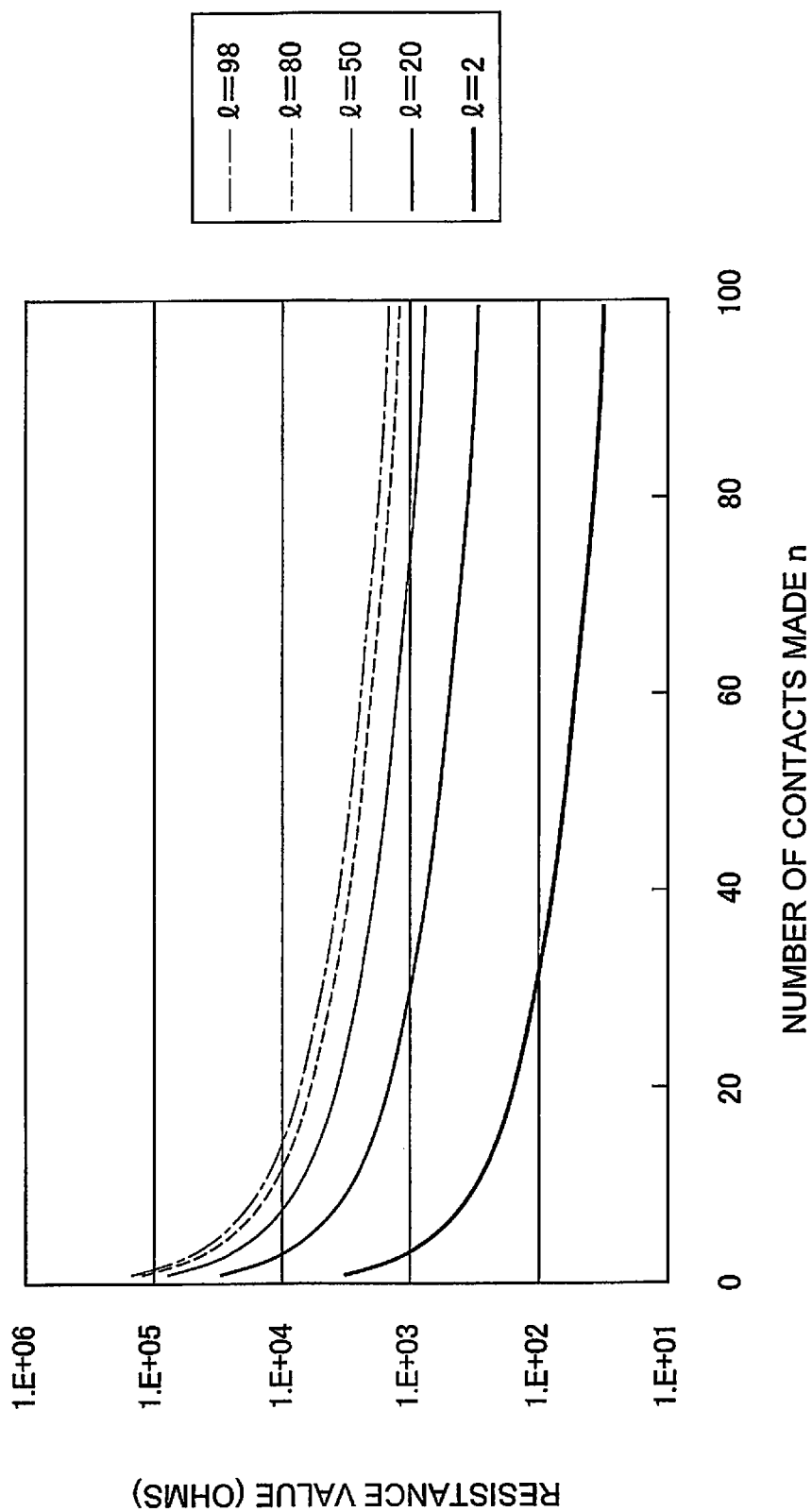
FIG. 9 is a graph wherein the relationship between the number of resistive films that make contact and the resistance value is drawn for various lengths from a contact location to a connection pattern.

Accordingly, the detection device 52 is configured such that it is capable of acquiring information that indicates the relationship between the coordinates and the resistance values RA, RB. FIG. 9 shows, for each distance, the relationship between the number of lines of resistive films that makes contact and the resistance value between the contact location and the connection pattern. The detection device 52, for example, stores a relational expression or data for deriving the relationship similar to that shown in FIG. 9. Alternatively, a configuration may be adopted such that the relational expression, data, or the like for deriving the relationship similar to that shown in FIG. 9 is read from an internal or external storage unit (not shown) of the microcontroller 50.

In addition, the detection device 52 is configured such that it can acquire data for calculating, based on the coordinates, the lengths between the contact location and the connection patterns 31b, 32b. For example, the detection device 52 stores a relational expression or data for calculating, based on the coordinates, the lengths between the contact location and the connection patterns 31b, 32b. Alternatively, a configuration may be adopted such that such a relational expression, data, or the like is read from an internal or external storage unit (not shown) of the microcontroller 50.

(6) Operational Effects of the First Embodiment

The touch sensor 10 according to the first embodiment comprises the upper part electrodes 31 (one example of first electrodes), the lower part electrodes 32 (one example of second electrodes) and the detection device 52. The upper part electrodes 31 are disposed such that they extend in the X axial direction (one example of a first direction) and are arrayed in the Y axial direction (one example of a second direction) that intersects the X axial direction. Furthermore, each upper part electrode 31 comprises six lines of upper part resistive films 31a (one example of first resistive films) whose end parts in the X axial direction are electrically connected to each other by the connection pattern 31b. The lower part electrodes 32 are disposed opposing the upper part resistive films 31a and comprise the lower part resistive films 32a, whose contact surface area with the upper part resistive films 31a varies, as shown in FIG. 2A and FIG. 2B, in accordance with a pressing force that narrows the spacing between the upper part resistive films 31a and the lower part resistive films 32a. For example, in the configuration explained in FIG. 1, the detection device 52 detects contact between the six lines of upper part resistive films 31a and the seven lines of lower part resistive films 32a based on the change in the resistance from the upper part electrodes 31 to the lower part electrodes 32.

Because the resistance value changes at the time of contact between the upper part resistive films 31a and the lower part resistive films 32a, the touch sensor 10 can detect, as in the conventional art, an input operation performed on the touch sensor 10. Meanwhile, at the time of contact between the six lines of upper part resistive films 31a and the seven lines of lower part resistive films 32a, because the resistance value RA greatly varies in accordance with the number of lines of the upper part resistive films 31a, which extend in the X axial direction, that makes contact, the magnitude of the pressing force during the input operation can be detected based on the extent of the contact surface area between the upper part resistive films 31a and the lower part resistive films 32a, which can be easily detected by the detection device 52.

Likewise, in the touch sensor 10, seven lines of the lower part resistive films 32a, whose end parts in the Y axial direction are electrically connected together by the connection pattern 32*b*, are also disposed such that they extend in the Y axial direction and are arrayed in the X axial direction. Because the resistance value RB varies greatly in accordance with the number of lines of the lower part resistive films 32*a*, which extend in the Y axial direction, that makes contact with the upper part resistive films 31*a*, the detection performed by the detection device 52 becomes easy.

In addition, in the example shown in FIG. 1, the touch sensor 10 is provided with the four sets of six lines of upper part resistive films 31*a* arrayed in the Y axial direction and the three sets of seven lines of lower part resistive films 32*a* arrayed in the X axial direction. Furthermore, the detection device 52 can detect the contact location by the coordinates within the XY plane of the matrix of the four sets of upper part resistive films 31*a* and the three sets of lower part resistive films 32*a*. For example, the touch sensor 10 of this type can be adapted to an electronic device wherein, if the touch sensor 10 is provided on a surface of an LCD of the electronic device, then an input can be performed while the display is being viewed. A smart phone, a tablet PC, a portable music player, a mobile phone, an electronic book reader, an IC recorder, and the like are examples of such electronic devices. Although not illustrated, if the microcontroller 50 of the touch sensor 10 is connected to a central processing unit (one example of a control apparatus) of an electronic device, then the XY coordinates and the pressing force on the surface of the LCD of the electronic device at which an input operation has been performed by a finger or the like can be input into the central processing unit (CPU) or the like. Furthermore, the location at which the touch sensor 10 is provided is not limited to the surface of an LCD and may be some other locations such as a surface of a casing of an electronic device. Furthermore, the input into the electronic device wherein the touch sensor 10 is used is not limited to being performed while the display is being viewed.

(7) Modified Example 1A

Figure 10:
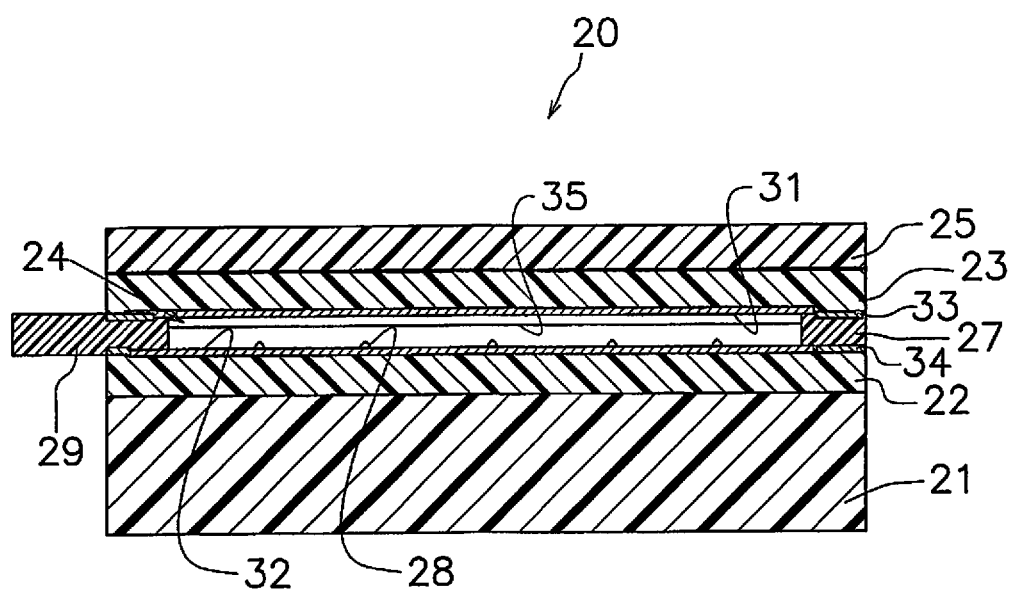
FIG. 10 is a schematic partial cross sectional view that shows another example of the layer structure of the sensor panel.

The abovementioned first embodiment described a case wherein the upper part resistive films 31*a* and the lower part resistive films 32*a* make direct contact, but the upper part resistive films 31*a* and the lower part resistive films 32*a* may make contact via another member. For example, as shown in FIG. 10, a pressure sensitive ink layer 35 may be provided on the lower surface of the upper part resistive films 31*a*. If the pressure sensitive ink layer 35 is provided like this, then the contact resistance Rcont when the upper part resistive films 31*a* and the lower part resistive films 32*a* make contact can be made to vary greatly in accordance with the pressing force. As a result, it becomes possible for the contact resistance Rcont shown in FIG. 9 to contribute to the detection of the pressing force in the detection device 52.

<Second Embodiment>

(8) Overview of Configuration of Touch Sensor

Figure 11:
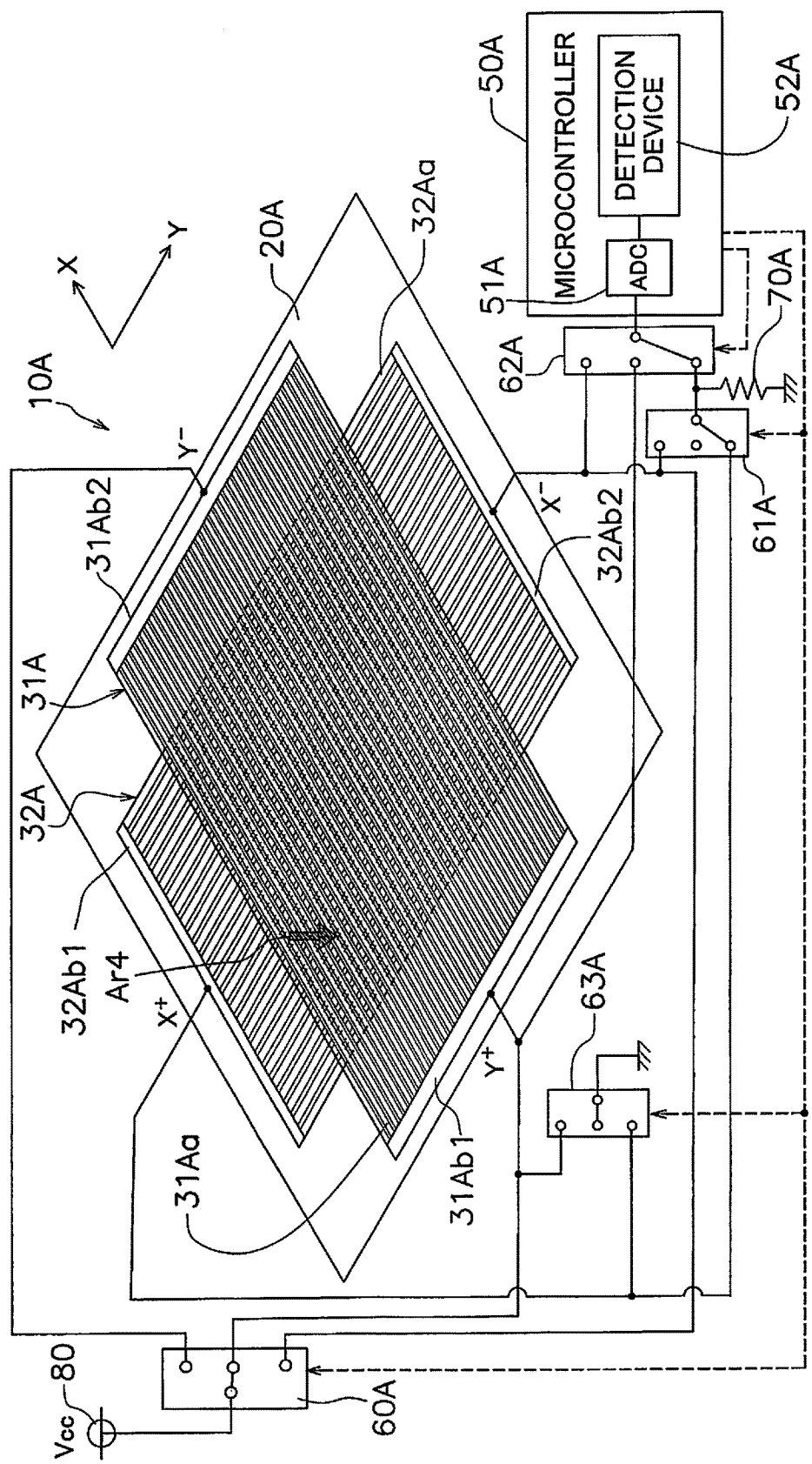
FIG. 11 is a schematic drawing that shows an overview of the touch sensor according to a second embodiment.

FIG. 11 is a schematic drawing that shows an overview of the touch sensor according to a second embodiment of the present invention. A touch sensor 10A comprises a sensor panel 20A, a microcontroller 50A, switch circuits 60A, 61A, 62A, 63A, and a reference resistor 70A. The touch sensor 10A shown in FIG. 11 detects, using a four-wire analog resistive type sensor, the position and the pressing force of contact made by a finger or the like in order to perform an input operation.

The sensor panel 20A is configured such that it can connect to the reference resistor 70A via the switch circuit 61A. The reference resistor 70A has a constant resistance value. In addition, the sensor panel 20A is connected to the DC supply 80, which impresses a DC voltage Vcc, via the switch circuit 60A. One terminal of the reference resistor 70A is connected to an output terminal of the switch circuit 61A, and the other terminal of the reference resistor 70A is connected to ground. The microcontroller 50A is configured such that it can connect to the one terminal of the reference resistor 70A or to a connection pattern 32Ab2 via the switch circuit 62A and inputs a voltage generated by the reference resistor 70A or the connection pattern 32Ab2. Furthermore, the sensor panel 20A is configured such that it can connect to ground via the switch circuit 63A.

An input terminal of the switch circuit 60A is connected to the DC supply 80. Three output terminals of the switch circuit 60A are connected to connection patterns 31Ab1, 31Ab2 on two ends of upper part resistive films 31Aa extending in the X axial direction and to the connection pattern 32Ab2 of lower part resistive films 32Aa extending in the Y axial direction. The switch circuit 60A switches the connection between the input terminal and the output terminals in response to a command from the microcontroller 50A, and thereby the DC voltage Vcc is impressed on any of the three connection patterns 31Ab1, 31Ab2, 32Ab2.

The switch circuit 61A has three input terminals and one output terminal and connects the output terminal to an input terminal selected among the three input terminals.

Two of the input terminals of the switch circuit 61A are connected to a connection pattern 32Ab1 and the connection pattern 32Ab2 on two ends of the lower part resistive films 32Aa extending in the Y axial direction. In addition, the remaining one input terminal is not connected to anything and is in an open state. Furthermore, the output terminal of the switch circuit 61A is connected to the one terminal of the reference resistor 70A. Based on such a circuit configuration, the switch circuit 61A switches the connection between the input terminals and the output terminal in response to a command from the microcontroller 50A, and thereby the one terminal of the reference resistor 70A and either of the two connection patterns 32Ab are connected, or the one terminal of the reference resistor 70A is not connected to anything and is in an open state.

The switch circuit 62A has three input terminals and one output terminal and connects the output terminal to an input terminal selected among the three input terminals. One of the input terminals of the switch circuit 62A is connected to the connection pattern 32Ab2, another input terminal is connected to the connection pattern 31Ab1 of the upper part resistive films 31Aa, and yet another input terminal is connected to the one terminal of the reference resistor 70A. Furthermore, the output terminal of the switch circuit 62A is connected to an A/D converter 51A in the microcontroller 50A. Based on such a circuit configuration, the switch circuit 62A switches the connection between the input terminals and the output terminal in response to a command from the microcontroller 50A and thereby the A/D converter 51A is connected to the connection pattern 32Ab2 of the lower part resistive films 32Aa, the connection pattern 31Ab1 of the upper part resistive films 31Aa, or the one terminal of the reference resistor 70A.

The microcontroller 50A comprises the A/D converter 51A and a detection device 52A. The A/D converter 51A outputs a digital signal in accordance with the value of a voltage that arises at the connection pattern 31Ab1 of the upper part resistive films 31Aa, the connection pattern 32Ab2 of the lower part resistive films 32Aa, or the one terminal of the reference resistor 70A. The detection device 52A senses, based on the digital signal output from the A/D converter 51A, the value of the voltage that arises at the reference resistor 70A and detects both the coordinates at which the upper part resistive films 31Aa and the lower part resistive films 32Aa make contact due to the input operation and the pressing force produced by that input operation.

(9) Structure of Sensor Panel

Figure 12A:
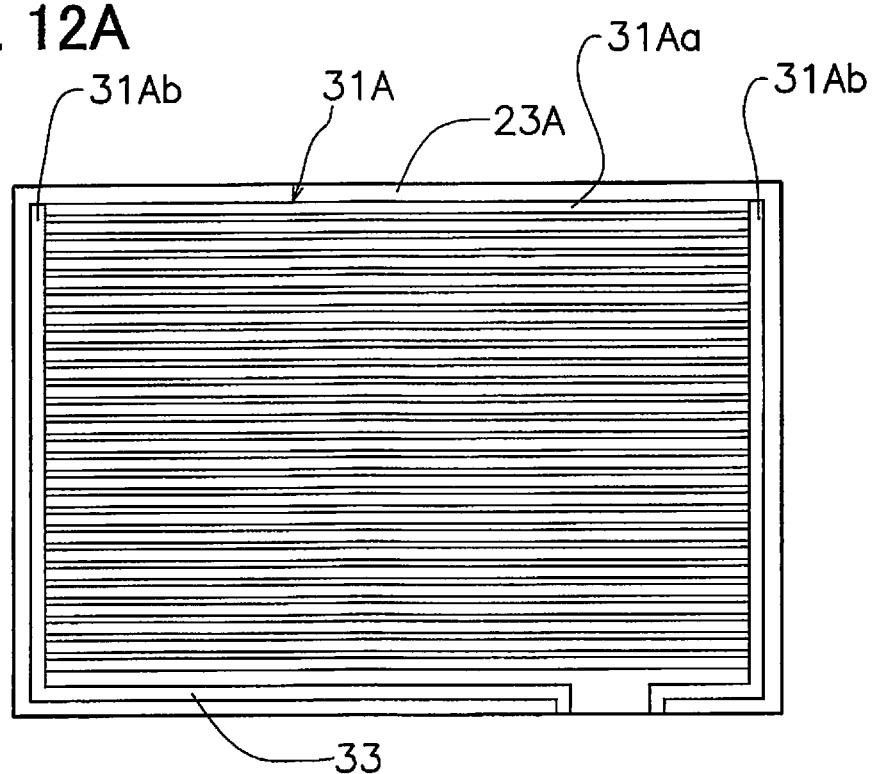
FIG. 12A is a plan view that shows the upper part electrode in FIG. 11 and the wiring patterns at the peripheries thereof.
Figure 12B:
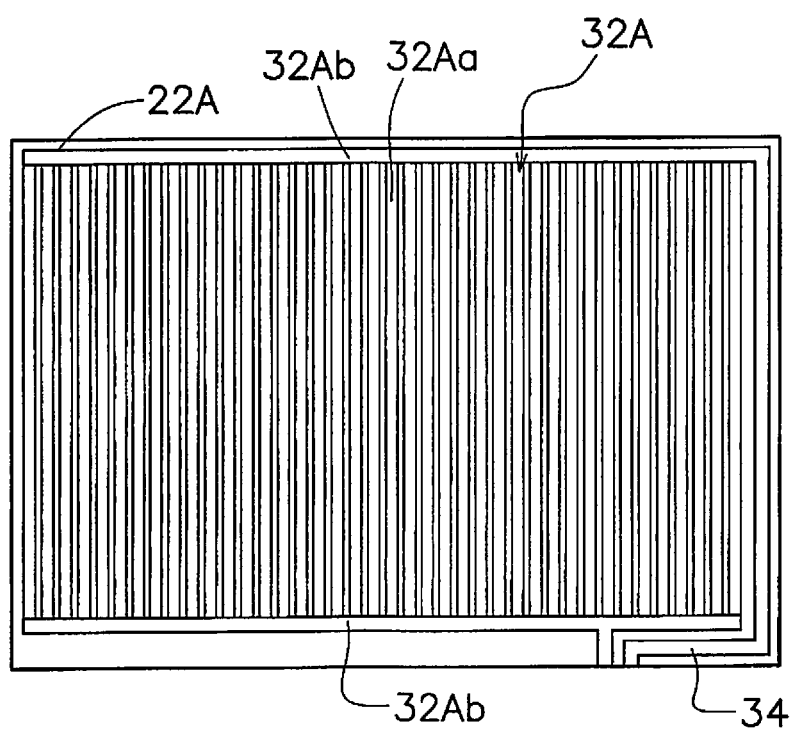
FIG. 12B is a plan view that shows the lower part electrode in FIG. 11 and the wiring patterns at the peripheries thereof.

The cross sectional structure of the sensor panel 20A is the same as the cross sectional structure of the sensor panel 20 shown in FIG. 3, and therefore an explanation thereof is omitted. FIG. 12A shows one example of a pattern on a lower surface of a PET film 23A, and FIG. 12B shows one example of a pattern on an upper surface of a PET film 22A. In the example shown in FIG. 12A, numerous upper part resistive films 31Aa, which are disposed such that they extend in the X axial direction and are arrayed in the Y axial direction, are provided on the lower surface of the PET film 23A. Two ends of the upper part resistive films 31Aa in the X axial direction are connected respectively to two connection patterns 31Ab. In the example shown in FIG. 12B, numerous lower part resistive films 32Aa, which are disposed such that they extend in the Y axial direction and are arrayed in the X axial direction, are provided on the upper surface of the PET film 22A. Two ends of the lower part resistive films 32Aa in the Y axial direction are connected respectively by two connection patterns 32Ab.

(10) Operation of Detection Device

The four-wire analog resistive type touch sensor 10A shown in FIG. 11 detects, using a method that is the same as a conventional method, the coordinates at which the upper part resistive films 31Aa and the lower part resistive films 32Aa make contact due to an input operation. Because the detection of the coordinates is performed in the same manner as in the conventional art, the connection state of the touch sensor will be explained herein, but an explanation of the detection operation performed at that time is omitted.

Figure 13A:
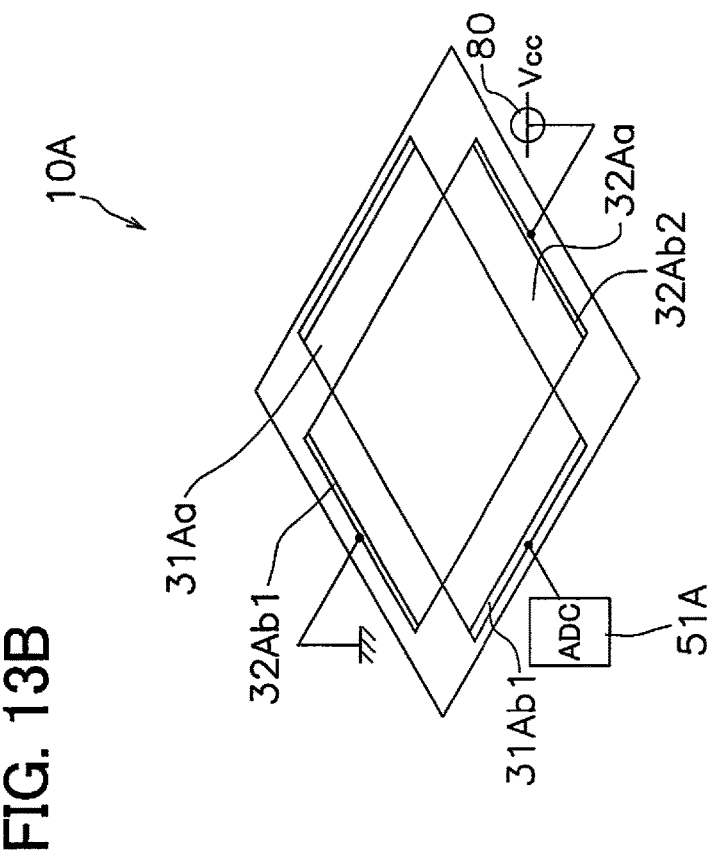
FIG. 13A is a schematic drawing for explaining the connection of a circuit during the detection of an X coordinate.

The detection of the X coordinate is performed, as shown in FIG. 13A, by the switch circuits 60A, 61A, 62A, 63A impressing the DC voltage Vcc on the connection pattern 31Ab2 of the upper part resistive films 31Aa and grounding the connection pattern 31Ab1 of the upper part resistive films 31Aa. At this time, the A/D converter 51A is connected to the connection pattern 32Ab2 of the lower part resistive films 32Aa. Furthermore, the one terminal of the reference resistor 70 is in the open state due to the switch circuits 61A, 62A, and the reference resistor 70 is not connected to the sensor panel 20A.

Figure 13B:
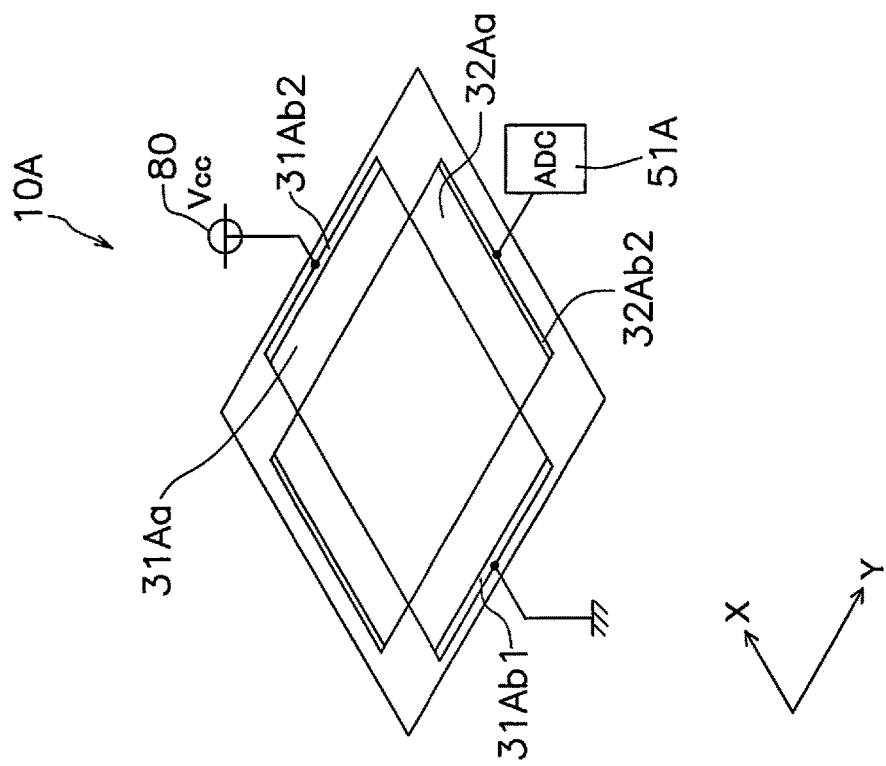
FIG. 13B is a schematic drawing for explaining the connection of the circuit during the detection of a Y coordinate.

The detection of the Y coordinate is performed, as shown in FIG. 13B, by the switch circuits 60A, 61A, 62A, 63A impressing the DC voltage Vcc on the connection pattern 32Ab2 of the lower part resistive films 32Aa and grounding the connection pattern 32Ab1 of the lower part resistive films 32Aa. At this time, the A/D converter 51A is connected to the connection pattern 31Ab1 of the upper part resistive films 31Aa. At this time, the one terminal of the reference resistor 70 is in the open state due to the switch circuits 61A, 62A, and the reference resistor 70 is not connected to the sensor panel 20A.

The detection of the pressing force is performed by splitting, into four parts, the area wherein an upper part electrode 31A and a lower part electrode 32A overlap. The microcontroller 50A determines whether the input operation is near the connection pattern 31Ab1 on the Y+ side or near the connection pattern 31Ab2 on the Y− side and determines whether the input operation is near the connection pattern 32Ab1 on the X+ side or near the connection pattern 32Ab2 on the X− side.

For example, if a location indicated by an arrow Ar4 is pressed and the upper part resistive film 31Aa and the lower part resistive film 32Aa at that portion make contact, then the resistance from the connection pattern 31Ab1 on the Y+ side to the connection pattern 32Ab1 on the X+ side is at its smallest. Accordingly, the detection of the coordinates and the detection of the pressing force are performed between the connection pattern 31Ab1 on the Y+ side and the connection pattern 32Ab1 on the X+ side, where the resistance is smallest. Under such circumstances the value of resistance change become apparent in the number of lines of the upper part resistive films 31Aa and the lower part resistive films 32Aa that makes contact.

Thus, when pressed at the location indicated by the arrow Ar4, as shown in FIG. 14A, the DC supply 80 is connected to the connection pattern 31Ab1 of the upper part resistive film 31Aa by the switch circuit 60A, and the one terminal of the reference resistor 70A is connected to the X+ side connection pattern 32Ab1 of the lower part resistive film 32Aa by the switch circuits 61A, 62A. In addition, for example, as shown in FIG. 11, in the switch circuit 63A, the position at which the sensor panel 20A is not grounded is selected. Furthermore, the value of the voltage of the connection pattern 32Ab1 is converted to a digital signal by the A/D converter 51A. The pressing force is detected by the detection device 52A using this digital signal.

The connections in FIG. 11 are the same as the connections in FIG. 14A and show a case wherein the DC supply 80 is connected to the upper part electrode 31A, the DC voltage Vcc is impressed in the Y axial direction, the lower part electrode 32A is connected to the microcontroller 50A, and the pressing force is detected.

Moreover, if the pressed location is near the connection pattern 31Ab1 on the Y+ side and near the connection pattern 32Ab2 on the X− side, then, as shown in FIG. 14B, the DC supply 80 is connected to the connection pattern 31Ab1 of the upper part resistive film 31Aa by the switch circuit 60A. In addition, at this time, the one terminal of the reference resistor 70A is connected to the X− side connection pattern 32Ab2 of the lower part resistive film 32Aa by the switch circuits 61A, 62A. The value of the voltage of the connection pattern 32Ab2 is converted to a digital signal by the A/D converter 51A, and the pressing force is detected by the detection device 52A. Furthermore, at this time, in the switch circuit 63A, the position at which the sensor panel 20A is not grounded is selected.

Figure 15A:
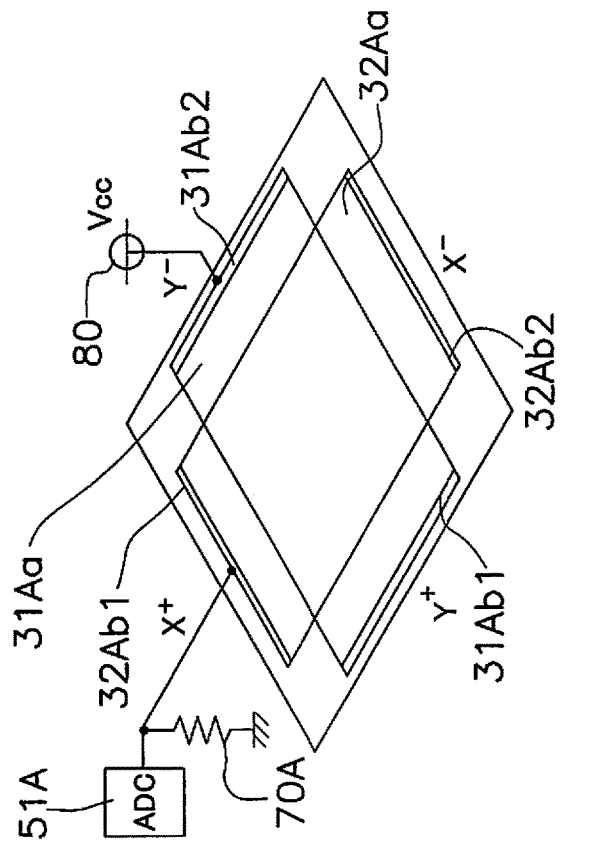
FIG. 15A is a schematic drawing that shows the circuit connection that detects the pressing force at locations near the Y− side and the X− side.

In addition, if the pressed location is near the connection pattern 31Ab2 on the Y− side and near the connection pattern 32Ab2 on the X− side, then, as shown in FIG. 15A, the DC supply 80 is connected to the connection pattern 31Ab2 of the upper part resistive film 31Aa by the switch circuit 60A. In addition, at this time, the one terminal of the reference resistor 70A is connected to the X− side connection pattern 32Ab2 of the lower part resistive film 32Aa by the switch circuits 61A, 62A. The value of the voltage of the connection pattern 32Ab2 is converted to a digital signal by the A/D converter 51A, and the pressing force is detected by the detection device 52A. Furthermore, at this time, in the switch circuit 63A, the position at which the sensor panel 20A is not grounded is selected.

Figure 15B:
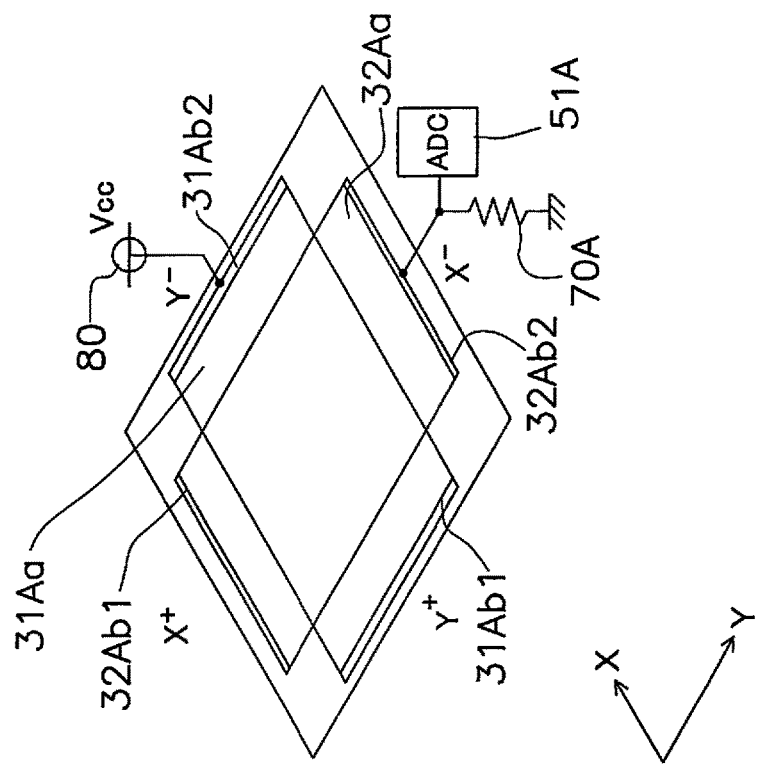
FIG. 15B is a schematic drawing that shows the circuit connection that detects the pressing force at locations near the Y− side and the X+ side.

In addition, if the pressed location is near the connection pattern 31Ab2 on the Y− side and near the connection pattern 32Ab1 on the X+ side, then, as shown in FIG. 15B, the DC supply 80 is connected to the connection pattern 31Ab2 of the upper part resistive film 31Aa by the switch circuit 60A. In addition, at this time, the one terminal of the reference resistor 70A is connected to the X+ side connection pattern 32Ab1 of the lower part resistive film 32Aa by the switch circuits 61A, 62A. The value of the voltage of the connection pattern 32Ab1 is converted to a digital signal by the A/D converter 51A, and the pressing force is detected by the detection device 52A. Furthermore, at this time, in the switch circuit 63A, the position at which the sensor panel 20A is not grounded is selected.

This is performed repetitively, and the microcontroller 50A selects one circuit connection among the circuit connections shown in FIG. 14A, FIG. 14B, FIG. 15A, or FIG. 15B according to the XY coordinates of the pressing location obtained based on the circuit connections in FIG. 13A and FIG. 13B.

Although omitted from the explanation, as in the detection device 52 of the first embodiment, the detection device 52A of the second embodiment is also configured such that it is capable of acquiring information that indicates the relationship between the coordinates and the resistance values RA, RB. The detection device 52A stores, for example, the relational expression or data for deriving the relationship similar to that shown in FIG. 9. Alternatively, a configuration may be adopted such that the relational expression, data, or the like for deriving the relationship similar to that shown in FIG. 9 is read from an internal or external storage unit (not shown) of the microcontroller 50A.

In addition, the detection device 52A is configured such that it is capable of acquiring data for calculating, based on the coordinates, the lengths between the contact location and the connection patterns 31Ab, 32Ab. For example, the detection device 52A stores a relational expression or data for calculating, based on the coordinates, the lengths between the contact location and the connection patterns 31Ab, 32Ab. Alternatively, a configuration may be adopted such that the relational expression, data, or the like of this type is read from an internal or external storage unit (not shown) of the microcontroller 50A.

Furthermore, if the detection device 52A is configured such that no same resistance values are obtained in accordance with the coordinates and the pressing force, do not overlap, then the coordinates and the pressing force can be detected simultaneously. For example, if the sensor panel 20A is configured such that two lines of the resistive films are connected when the pressing force is large and one line of the resistive films is connected when the pressing force is small, then the change in the resistance value due to the pressing force will either be the resistance value of one line of resistive film or one half of that value. Accordingly, if the range of the change in the resistance value due to the coordinates is made smaller than one half of the resistance value of one line of resistive film, then the resistance value due to the combination of the coordinates and the pressing force can be uniquely determined.

(11) Operational Effects of Second Embodiment

The touch sensor 10A according to the second embodiment comprises the upper part electrode 31A (one example of the first electrode), the lower part electrode 32A (one example of the second electrode), and the detection device 52A. The upper part electrode 31A is disposed such that it extend in the X axial direction (one example of the first direction) and is arrayed in the Y axial direction (one example of the second direction), which intersects the X axial direction. The upper part electrode 31A comprises multiple lines of upper part resistive films 31Aa (one example of the first resistive films) whose end parts in the X axial direction are electrically connected to each other by the connection patterns 3 l Ab. The lower part electrode 32A is disposed opposing the upper part resistive films 31Aa, the lower part electrode 32A comprising the lower part resistive films 32Aa whose contact surface area with the upper part resistive films 31Aa varies, as shown in FIG. 2A, FIG. 2B, and the like, in accordance with the pressing force that narrows the spacing to the upper part resistive films 31Aa. The detection device 52A detects contact between the upper part resistive films 3 l Aa and the lower part resistive films 32Aa based on the change in the resistance from the upper part electrode 31A to the lower part electrode 32A.

Because the resistance value varies at the time of contact between the upper part resistive films 31Aa and the lower part resistive films 32Aa, the touch sensor 10A can detect, as in the conventional art, an input operation performed on the touch sensor 10A. Moreover, at the time of contact between the upper part resistive films 31Aa and the lower part resistive films 32Aa, because the resistance value RA varies greatly in accordance with the number of lines of the upper part resistive films 31Aa, which extend in the X axial direction, that makes contact, the magnitude of the pressing force during the input operation can be detected based on the extent of the contact surface area between the upper part resistive films 31Aa and the lower part resistive films 32Aa, which can be easily detected by the detection device 52A.

Likewise, in the touch sensor 10A, multiple lines of lower part resistive films 32Aa, whose end parts in the Y axial direction are electrically connected to each other by the connection patterns 32Ab, are also disposed such that they extend in the Y axial direction and are arrayed in the X axial direction. At the time of contact between the upper part resistive films 31Aa and the lower part resistive films 32Aa, because the resistance value RB varies greatly in accordance with the number of lines of the lower part resistive films 32Aa, which extend in the Y axial direction, that makes contact, the detection performed by the detection device 52A becomes easy.

In addition, the touch sensor 10A is provided with the multiple lines of upper part resistive films 31Aa, which are arrayed in the Y axial direction, and is provided with the multiple lines of lower part resistive films 32Aa, which are arrayed in the X axial direction. Furthermore, the detection device 52A can detect the contact location at the coordinates within the XY plane using a four-wire analog resistive type sensor wherein the upper part resistive films 31Aa and lower part resistive films 32Aa are used. For example, if the touch sensor 10A of this type is provided to the surface of an LCD, it can be used as a touch panel. For example, if the touch sensor 10A of this type is provided to the surface of an LCD of an electronic device and the microcontroller 50A is connected to the CPU of the electronic device, then the ability to input, into the CPU, the XY coordinates and the pressing force on the surface of the LCD at which an input operation was performed by a finger or the like is the same as in the touch sensor 10 of the first embodiment. In addition, as in the touch sensor 10, the location at which the touch sensor 10A is provided is also not limited to the surface of an LCD, and may be some other locations such as the surface of a casing of an electronic device. Furthermore, the input into the electronic device wherein the touch sensor 10A is used is also not limited to being performed while the display is being viewed.

(12) Modified Example 2A

Figure 16A:
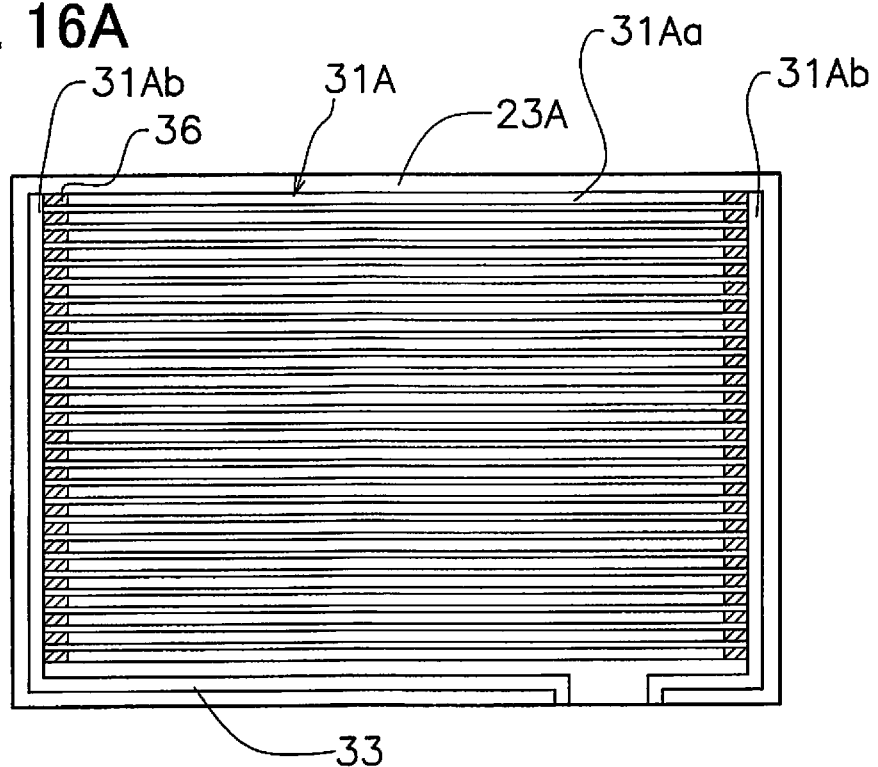
FIG. 16A is a plan view that shows another example of the upper part electrode in FIG. 11 and the wiring patterns at the peripheries thereof.
Figure 16B:
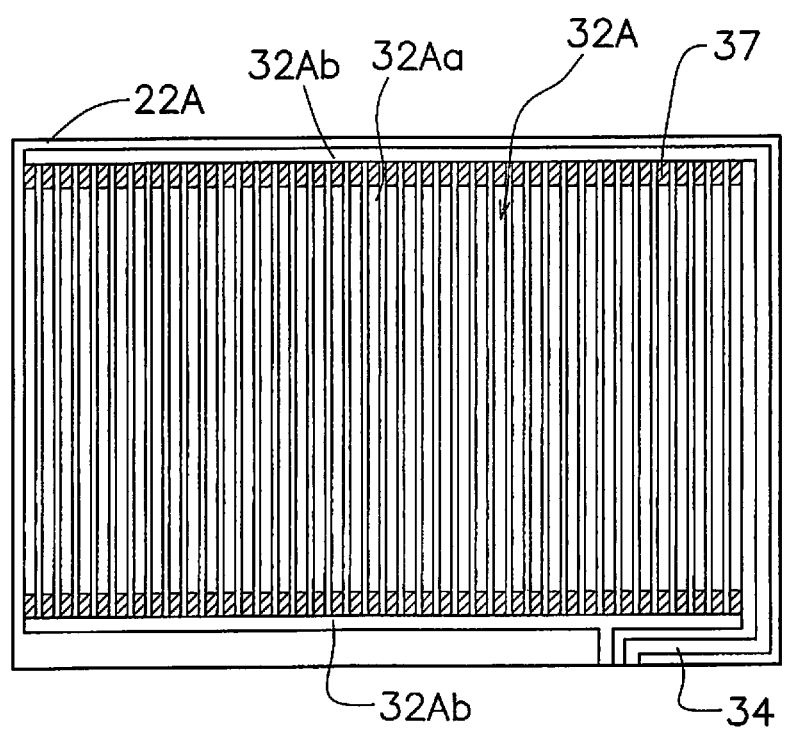
FIG. 16B is a plan view that shows another example of the lower part electrode in FIG. 11 and the wiring patterns at the peripheries thereof.

The abovementioned second embodiment described the case wherein the upper part resistive films 31Aa and the lower part resistive films 32Aa are directly connected to the connection patterns 31Ab, 32Ab, which have high electrical conductivity, but the upper part resistive films 31Aa and the lower part resistive films 32Aa may be connected to the connection patterns 31Ab, 32Ab via high resistance members 36, 37 (an example of resistance adding members) as shown in FIG. 16A and FIG. 16B. The high resistance members 36, 37 can be formed of, for example, carbon paste or the like. Thus increasing the resistance value of each resistive film of the upper part resistive films 31Aa and the lower part resistive films 32Aa makes it possible to increase the change in the resistance value attributable to the number of lines of the resistive films that makes contact. Thereby, it becomes easier to detect the change in the pressing force.

<Third Embodiment>

(13) Overview of Configuration of Touch Sensor

Figure 17A:
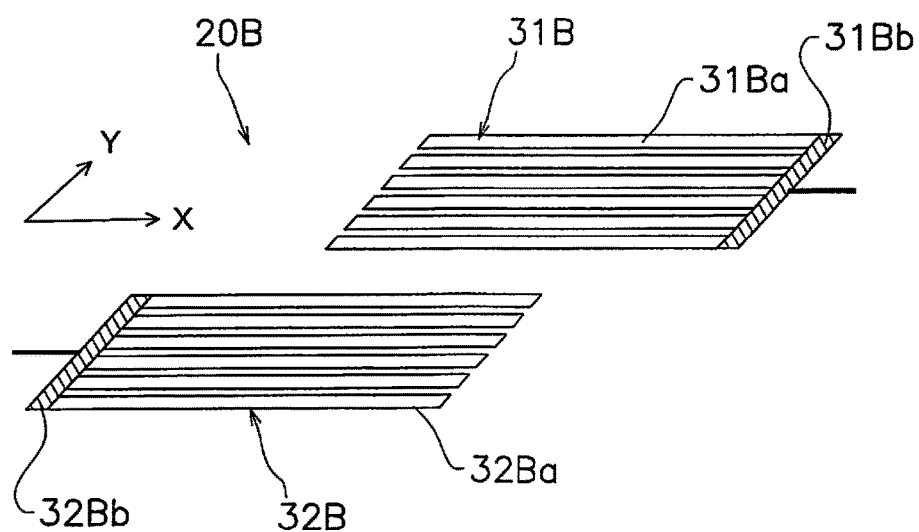
FIG. 17A is an oblique schematic drawing that shows an overview of the sensor panel according to a third embodiment.
Figure 17B:
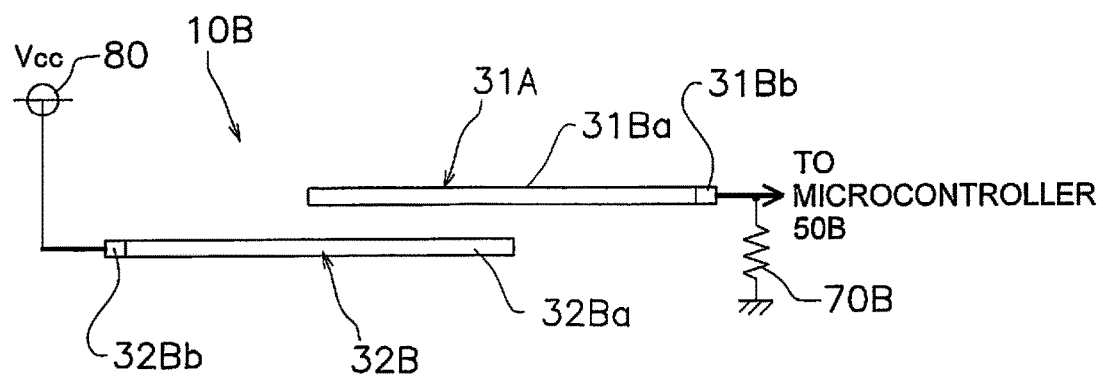
FIG. 17B is a side schematic drawing that shows an overview of the touch sensor according to the third embodiment.

The touch sensors 10, 10A of the abovementioned first embodiment and second embodiment can detect both the XY coordinates and the pressing force; however, the present invention can also be adapted to a simple configuration wherein it is possible to detect contact and non-contact and to detect the pressing force. In a touch sensor 10B shown in FIG. 17A and FIG. 17B, six lines of upper part resistive films 31Ba (one example of the first resistive films) of an upper part electrode 31B (one example of the first electrode), which are formed of a transparent electrically conductive film such as ITO, are disposed such that they extend in the X axial direction (one example of the first direction) and are arrayed in the Y axial direction (one example of the second direction). Furthermore, six lines of lower part resistive films 32Ba (one example of second resistive films) of a lower part electrode 32B (one example of the second electrode), which are formed of a transparent electrically conductive film such as ITO, are disposed such that they extend in the X axial direction and are arrayed in the Y axial direction. In addition, the touch sensor 10B comprises a reference resistor 70B. Although not illustrated in FIG. 17A and FIG. 17B, a microcontroller 50B of the touch sensor 10B likewise has the same configuration as the microcontrollers 50, 50A, which comprise the A/D converters 51, 51A and the detection devices 52, 52A.

The end parts in the X axial direction of the six lines of upper part resistive films 31Ba are electrically connected to each other by a connection pattern 31Bb, and the end parts in the X axial direction of the six lower part resistive films 32Ba are electrically connected to each other by a connection pattern 32Bb. The six lines of upper part resistive films 31Ba and the six lines of lower part resistive films 32Ba are disposed such that they have a one-to-one correspondence to one another. At the time of contact between the six upper part resistive films 31Ba and the six lower part resistive films 32Ba, because the resistance value varies greatly at the upper part resistive films 31Ba and the lower part resistive films 32Ba, which extend in the X axial direction, the detection performed by the detection device becomes easy.

(14) Modified Example 3A

The abovementioned third embodiment described a case wherein there is a multiple lines of both the upper part resistive films 31Ba of the upper part electrode 31B and the lower part resistive films 32Ba of the lower part electrode 32B, but the third embodiment may comprise just one line of upper part resistive film 31Ba or one line of lower part resistive film 32Ba, as in the upper part electrode 131 and the lower part electrode 132 shown in FIG. 7.

(15) Modified Example 3B

The abovementioned third embodiment described a case wherein the upper part electrode 31B and the lower part electrode 32B are transparent electrodes made of ITO or the like, but the upper part electrode 31B, the lower part electrode 32B, the connection patterns 31Bb, 32Bb, and the wiring patterns (not shown) connected thereto can also all be made of an opaque electrode material, such as silver paste, copper thin film, or the like.

The above described an embodiment of the present invention, but the present invention is not limited to the abovementioned embodiment, and it is understood that variations and modifications may be effected without departing from the spirit and scope of the invention. In particular, a plurality of the embodiments and modified examples described in the present specification can be arbitrarily combined as needed. For example, the modified example 1A can be adapted to the touch sensor 10A of the second embodiment and the touch sensor 10B of the third embodiment. In addition, the modified example 2A can be adapted to the touch sensor 10 of the first embodiment and the touch sensor 10B of the third embodiment. Furthermore, the modified examples 3A, 3B can be adapted to the touch sensor 10 of the first embodiment and the touch sensor 10A of the second embodiment.

The invention claimed is:

1. A touch sensor comprising:
a first electrode that comprises a plurality of lines of first resistive films, the plurality of lines of first resistive films being disposed to extend in a first direction and arrayed in a second direction that intersects the first direction, whose end parts in the first direction are electrically connected to each other;
a first connection pattern for electrically connecting together the end parts in the first direction of the plurality of lines of the first resistive films;
a second electrode that comprises at least one line of second resistive film disposed opposing the plurality of lines of first resistive films,
a pressure sensitive ink layer that is provided between the plurality of lines of first resistive films and the at least one second resistive film and positioned with a spacing between the pressure sensitive ink layer and the at least one second resistive film, a resistance value of the pressure sensitive ink layer varying in accordance with the pressing force between the plurality of lines of first resistive films and the at least one second resistive film, and contact surface area between the at least one line of second resistive film and the pressure sensitive ink layer varying in accordance with a pressing force that narrows the spacing between the pressure sensitive ink layer and the at least one second resistive film;
a second connection pattern for electrically connecting the end part in the second direction of the at least one second resistive film; and
a detection device that, based on a change in a resistance value from the first electrode to the second electrode as measured by a resistance measuring apparatus connecting to the first connection pattern and the second connection pattern, detects a contact between the pressure sensitive ink layer and the at least one line of second resistive film, and the detection device determines, based on the resistance value, a number of the lines of first resistive films in contact with the at least one line of second resistive film via the pressure sensitive ink layer as represented by a size of the contact surface area between the pressure sensitive ink layer and the at least one line of second resistive film.

2. The touch sensor according to claim 1, wherein the second electrode includes a plurality of lines of the second resistive films having end parts in the second direction electrically connected to each other by the second connection pattern and the plurality of lines of the second resistive films are disposed to extend in the second direction and arrayed in the first direction.

3. The touch sensor according to claim 2, wherein
the detection device detects a coordinate in the first direction of a contact location between the first electrode and the second electrode based on a change in the resistance value detected by applying to each of the plurality of lines of first resistive films a first voltage that generates an electric potential difference in the first direction, and detects a coordinate in the second direction of the contact location based on a change in the resistance value detected by applying to the at least one line of second resistive film a second voltage that generates an electric potential difference in the second direction.

4. The touch sensor according to claim 3, further comprising
a plurality of resistance adding members that are connected between the plurality of lines of first resistive films and the first connection pattern, each resistance adding member adding resistance to a corresponding line of first resistive film.

5. The touch sensor according to claim 2, wherein
the plurality of lines of first resistive films are arranged into a plurality of sets arrayed in the second direction;
the at least one line of second resistive film are arranged into a plurality of sets arrayed in the first direction; and
the detection device sequentially applies a predetermined voltage to the plurality of sets of the plurality of lines of first resistive films, sequentially applies the predetermined voltage to the plurality of sets of the plurality of lines of second resistive films, and in response to the sequentially applied predetermined voltage detects the coordinates in the first direction and the second direction of a contact location based on a matrix of the plurality of sets of the plurality of lines of first resistive films and the plurality of sets of the at least one of second resistive films.

6. The touch sensor according to claim 5, further comprising
a plurality of resistance adding members that are connected between the plurality of lines of first resistive films and the first connection pattern, each resistance adding member adding resistance to a corresponding line of first resistive film.

7. The touch sensor according to claim 1, wherein
the detection device detects a coordinate in the first direction of a contact location between the first electrode and the second electrode based on a change in the resistance value detected by applying to each of the plurality of lines of first resistive films a first voltage that generates an electric potential difference in the first direction, and detects a coordinate in the second direction of the contact location based on a change in the resistance value detected by applying to the at least one line of second resistive film a second voltage that generates an electric potential difference in the second direction.

8. The touch sensor according to claim 1, wherein
the plurality of lines of first resistive films are arranged into a plurality of sets arrayed in the second direction;
the at least one line of second resistive film are arranged into a plurality of sets arrayed in the first direction; and
the detection device sequentially applies a predetermined voltage to the plurality of sets of the plurality of lines of first resistive films, sequentially applies the predetermined voltage to the plurality of sets of the plurality of lines of second resistive films, and in response to the sequentially applied predetermined voltage detects the coordinates in the first direction and the second direction of a contact location based on a matrix of the plurality of sets of the plurality of lines of first resistive films and the plurality of sets of the at least one of second resistive films.

9. The touch sensor according to claim 1, further comprising:
a plurality of resistance adding members that are connected between the plurality of lines of first resistive films and the first connection pattern, each resistance adding member adding resistance to a corresponding line of first resistive film.

10. An electronic device, comprising:
a touch sensor according to claim 1; and
a control apparatus connected to the touch sensor and that receives input data related to contact between the plurality of lines of first resistive films and the at least one second resistive film detected by the detection device and related to the size of the contact surface area between the plurality of lines of first resistive films and the at least one second resistive film.

11. The touch sensor according to claim 1 further comprising at least one of the following
a first wiring pattern comprising a plurality of first wires and configured such that one of the first wires is connected to the first connection pattern to connect to the plurality of lines of the first resistive films via the first connection pattern; and
a second wiring pattern comprising a plurality of second wires and configured such that one of the second wires is connected to the second connection pattern to connect to a plurality of lines of the second resistive films via the second connection pattern.

12. The touch sensor according to claim 1, further comprising at least one of the following
a first wiring pattern that is connected to the first connection pattern and has a first wiring pattern resistance less than a first resistive film resistance of the first resistive films; and
a second wiring pattern that is connected to the second connection pattern and has a second wiring pattern resistance less than a second resistive film resistance of the second resistive films.

13. The touch sensor according to claim 1, wherein
the plurality of lines of the first resistive films are not connected with each other in a region where the at least one second opposes the plurality of lines of the first resistive films.

* * * * *